United States Patent
Schnapp et al.

(10) Patent No.: US 7,814,293 B2
(45) Date of Patent: Oct. 12, 2010

(54) REDUNDANT CONTROLLER HOST-SIDE IO REROUTING

(75) Inventors: Michael Gordon Schnapp, Banqiao (TW); Chih-Chung Chan, Banqiao (TW)

(73) Assignee: Infotrend Technology Inc., Taipei Hsien (TW)

( * ) Notice: Subject to any disclaimer, the term of this patent is extended or adjusted under 35 U.S.C. 154(b) by 39 days.

(21) Appl. No.: 11/182,840

(22) Filed: Jul. 18, 2005

(65) Prior Publication Data

US 2006/0015692 A1   Jan. 19, 2006

Related U.S. Application Data

(60) Provisional application No. 60/521,893, filed on Jul. 19, 2004.

(51) Int. Cl.
G06F 9/26   (2006.01)
(52) U.S. Cl. .......................... 711/202; 711/114; 714/6; 714/710
(58) Field of Classification Search ............... 711/202, 711/114; 710/74; 714/6, 710
See application file for complete search history.

(56) References Cited

U.S. PATENT DOCUMENTS

| | | | |
|---|---|---|---|
| 6,654,831 B1 * | 11/2003 | Otterness et al. .............. 710/74 |
| 6,732,289 B1 * | 5/2004 | Talagala et al. ................ 714/6 |
| 6,996,752 B2 * | 2/2006 | Hetrick et al. ............. 714/710 |
| 2003/0204683 A1 | 10/2003 | Okumoto et al. |
| 2006/0015684 A1 * | 1/2006 | Schnapp et al. ............ 711/114 |
| 2007/0022192 A1 * | 1/2007 | Nguyen et al. ............. 709/224 |

FOREIGN PATENT DOCUMENTS

| | | |
|---|---|---|
| EP | 0709779 | 5/1996 |
| EP | 0769744 | 4/1997 |
| EP | 1132805 | 9/2001 |

* cited by examiner

*Primary Examiner*—Tuan V. Thai
*Assistant Examiner*—Yong Choe
(74) *Attorney, Agent, or Firm*—Rosenberg, Klein & Lee

(57) ABSTRACT

A redundant controller storage virtualization subsystem performing host-side IO rerouting and dynamic logical media unit reassignment. In one embodiment, when a host IO request is received by a storage virtualization controller that is not a logical media unit owner of the logical media unit addressed by the IO request, the IO can be rerouted to the alternate storage virtualization controller, the logical media unit owner, to be executed. In another embodiment, the assignment of logical media unit owner can be dynamically reassigned to the receiving storage virtualization controller which was originally not the logical media unit owner such that the receiving storage virtualization controller becomes new logical media unit owner to execute the IO request. In a further embodiment, the dynamic logical media unit reassignment can be performed according to the operating condition(s) of the storage virtualization system so as to improve the performance of the storage virtualization system.

28 Claims, 27 Drawing Sheets

REDUNDANT CONTROLLER HOST-SIDE IO REROUTING

CROSS-REFERENCE TO RELATED APPLICATION

This application claims the priority benefit of U.S. Provisional Application Ser. No. 60/521,893, filed on Jul. 19, 2004, the full disclosures of which are incorporated herein by reference.

BACKGROUND

1. Field of Invention

The present invention relates to a method for performing host-side IO rerouting in a redundant storage virtualization subsystem.

2. Description of Related Art

Storage virtualization is a technology that has been used to virtualize physical storage by combining sections of physical storage devices (PSDs) into logical storage entities, herein referred to as logical media units which will be explained later in more detail, that are made accessible to a host system. This technology has been used primarily in redundant arrays of independent disks (RAID) storage virtualization, which combines smaller physical storage devices into larger, fault tolerant, higher performance logical media units via RAID technology.

A logical media unit, abbreviated LMU, is a storage entity whose individual storage elements (e.g., storage blocks) are uniquely addressable by a logical storage address. One common example of a LMU is the presentation of the physical storage of a HDD to a host over the host IO-device interconnect. In this case, while on the physical level, the HDD is divided up into cylinders, heads and sectors, what is presented to the host is a contiguous set of storage blocks (sectors) addressed by a single logical block address. Another example is the presentation of a storage tape to a host over the host IO-device interconnect.

A Storage virtualization Controller, abbreviated SVC, is a device the primary purpose of which is to map combinations of sections of physical storage media to LMUs visible to a host system. IO requests received from the host system are parsed and interpreted and associated operations and data are translated into physical storage device IO requests. This process may be indirect with operations cached, delayed (e.g., write-back), anticipated (read-ahead), grouped, etc. to improve performance and other operational characteristics so that a host IO request may not necessarily result directly in physical storage device IO requests in a one-to-one fashion.

An External (sometimes referred to as "Stand-alone") Storage Virtualization Controller is a Storage Virtualization Controller that connects to the host system via an IO interface and that is capable of supporting connection to devices that reside external to the host system and, otherwise, operates independently of the host.

One example of an external Storage Virtualization Controller is an external, or stand-alone, direct-access RAID controller. A RAID controller combines sections on one or multiple physical storage devices (PSDs), the combination of which is determined by the nature of a particular RAID level, to form LMUs that are contiguously addressable by a host system to which the LMU is made available. A single RAID controller will typically support multiple RAID levels so that different LMUs may consist of sections of PSDs combined in different ways by virtue of the different RAID levels that characterize the different units.

Another example of an external Storage Virtualization Controller is a JBOD emulation controller. A JBOD, short for "Just a Bunch of Drives", is a set of PSDs that connect directly to a host system via one or more a multiple-device IO device interconnect channels. PSDs that implement point-to-point IO device interconnects to connect to the host system (e.g., Parallel ATA HDDs, Serial ATA HDDs, etc.) cannot be directly combined to form a "JBOD" system as defined above for they do not allow the connection of multiple devices directly to the IO device channel.

Another example of an external Storage Virtualization Controller is a controller for an external tape backup subsystem.

A Storage Virtualization Subsystem consists of one or more above-mentioned SVCs or external SVCs, and at least one PSD connected thereto to provide storage therefor.

A redundant SVS is a SVS comprising two or more SVCs configured redundantly. The primary motivation in configuring a pair of Storage Virtualization Controllers into a redundant pair is to allow continued, uninterrupted access to data by the host even in the event of a malfunction or failure of a single SVC. This is accomplished by incorporating functionality into the SVCs that allow one controller to take over for the other in the event that the other becomes handicapped or completely incapacitated. On the device side, this requires that both controllers are able to engage access to all of the PSDs that are being managed by the SVCs, no matter by which SVC any given PSD may be initially assigned to be managed. On the host side, this requires that each SVC have the ability to present and make available all accessible resources to the host, including those that were originally assigned to be managed by the alternate SVC, in the event that its mate does not initially come on line or goes off line at some point (e.g., due to a malfunction/failure, maintenance operation, etc.).

A typical device-side implementation of this would be one in which device-side IO device interconnects are of the multiple-initiator, multiple-device kind, and all device-side IO device interconnects are connected to both SVCs such that either SVC can access any PSD connected on a device-side IO device interconnect. When both SVCs are on-line and operational, each PSD would be managed by one or the other SVC, typically determined by user setting or configuration. As an example, all member PSDs of a LMU that consists of a RAID combination of PSDs would be managed by the particular SVC to which the LMU itself is assigned.

A typical host-side implementation would consist of multiple-device IO device interconnects to which the host(s) and both SVCs are connected and, for each interconnect, each SVC would present its own unique set of device IDs, to which sections of LMUs are mapped. If a particular SVC does not come on line or goes off line, the on-line SVC presents both sets of device IDs on the host-side interconnect, it's own set together with the set normally assigned to it's mate, and maps sections of LMUs to these IDs in the identical way they are mapped when both SVCs are on-line and fully operational. In this kind of implementation, no special functionality on the part of the host that switches over from one device/path to another is required to maintain access to all sections of LMUs in the event that a SVC is not on-line or goes off line. This kind of implementation is commonly referred to as "transparent" redundancy.

Redundant SVC configurations are typically divided into two categories. The first is "active-standby" in which one SVC is presenting, managing and processing all IO requests for all LMUs in the Storage Virtualization Subsystem (abbreviated SV subsystem or SVS) while the other SVC simply stands by ready to take over in the event that the active SVC becomes handicapped or incapacitated. The second is "active-active" in which both SVCs are presenting, managing and processing IO requests for the various LMUs that are present in the SVS concurrently. In active-active configurations, both SVCs are always ready to take over for the other in the event that it malfunctions causing it to become handicapped or incapacitated. Active-active configurations typically provide better levels of performance because the resources of both SVCs (e.g., CPU time, internal bus bandwidth, etc) can be brought to bear in servicing IO requests rather than the resources of only one.

Another essential element of a redundant SV subsystem is the ability for each SVC to monitor the status of the other. Typically, this would be accomplished by implementing inter-controller communications channels (abbreviated ICC channel) between the two SVCs over which they can exchange operating status. These communications channels may be dedicated, the sole function of which is to exchange parameters and data relating to the operation of the redundant SV subsystem, or they could be one or more of the IO device interconnects, host-side or device-side, over which operational parameter and data exchange is multiplexed together with host-SVC or device-SVC IO-request-associated data on these interconnects. They could also be a combination of dedicated and multiplexed interconnects.

Yet another important element of a redundant SV subsystem is the ability of one SVC to completely incapacitate the other so that it can completely take over for the other SVC without interference. For example, for the surviving SVC to take on the identity of it's mate, it may need to take on the device IDs that the SVC going off line originally presented on the host-side IO device interconnect, which, in turn, requires that the SVC going off line relinquish its control over those IDs. This "incapacitation" is typically accomplished by the assertion of reset signal lines on the controller being taken off line bringing all externally connected signal lines to a pre-defined state that eliminates the possibility of interference with the surviving SVC. Interconnecting reset lines between the SVCs so that one can reset the other in this event is one common way of achieving this. Another way to accomplish this is to build in the ability of an SVC to detect when itself may be malfunctioning and "kill" itself by asserting its own reset signals (e.g., inclusion of a "watchdog" timer that will assert a reset signal should the program running on the SVC fail to poll it within a predefined interval), bringing all externally connected signal lines to a pre-defined state that eliminates the possibility of interference with the surviving SVC.

SUMMARY

The present invention is directed to an operating method for performing host-side IO rerouting in a redundant storage virtualization subsystem.

The invention provides an operating method that when a host IO request is received by a storage virtualization controller that is not a logical media unit owner of the logical media unit addressed by the IO request, the IO request can be rerouted to the alternate storage virtualization controller, i.e., the logical media unit owner, to be executed.

The invention provides a still further operating method that the storage virtualization system can perform both host-side IO rerouting and dynamic logical media unit reassignment concurrently.

The invention provides one more operating method that the storage virtualization system can perform the Split Redundant Pathing functionality with the host entity.

As embodied and broadly described herein, the invention provides a method performing host-side IO rerouting and/or dynamic logical media unit reassignment in a redundant storage virtualization subsystem.

In addition, the invention also provides a storage virtualization subsystem implementing the method, a computer system including the storage virtualization subsystem, and a storage virtualization controller for implementing the method.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the preferred embodiment, with reference made to the accompanying drawings as follows.

DESCRIPTION OF THE PREFERRED EMBODIMENTS

Figure 1:
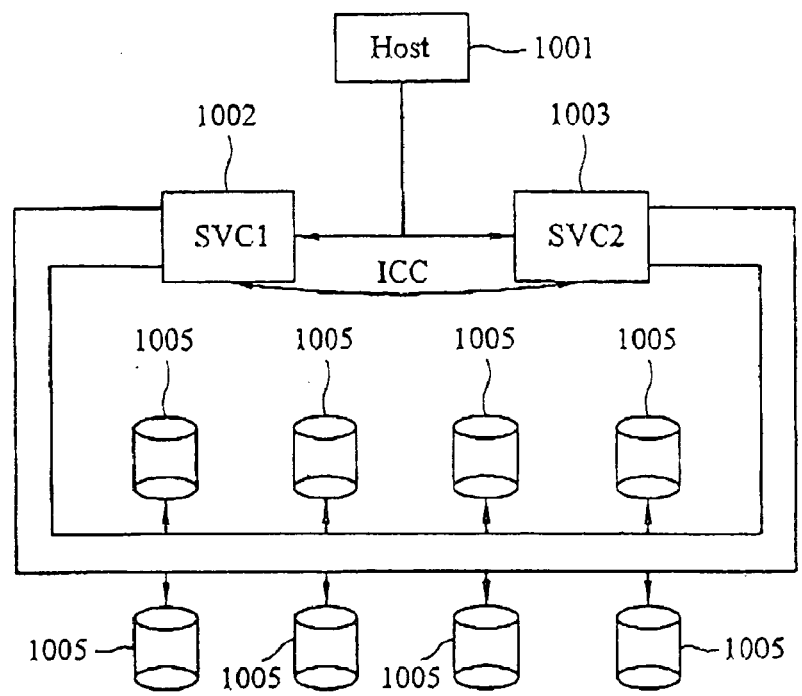
FIG. 1 is a block diagram of a typical redundant storage virtual subsystem implementation.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of a typical redundant storage virtualization subsystem (SVS) implementation 1000. The SVS 1000 comprises two storage virtualization controllers (SVCs) SVC1 1002 and SVC2 1003, and a plurality of physical storage devices (PSDs) 1005 connected thereto through two device-side IO device interconnects. An inter-controller communications channels (ICC channel) is implemented between the two SVCs. The SVCs 1002, 1003 are connected to a host entity 1001 through the host-side IO device interconnects. Note the interconnection of the host-side IO device interconnects that allows a SVC (e.g., SVC1 1002) to take over for its mate (SVC2 1003) by taking over the IO device interconnect IDs that would normally be presented onto the interconnect, by its mate and mapping sections of LMUs to these IDs in the same way its mate would. Also, note the interconnection of the device-side IO device interconnects that allow both SVCs 1001 and 1002) access to all PSDs 1005 connected to the device-side IO device interconnects. In this example, a typical IO device interconnect that might be used on either host side or device side might be parallel SCSI or Fibre FC-AL, for these are both multiple-initiator, multiple-device IO device interconnects and, therefore, allow both SVCs operating in target mode (i.e., device mode) to be connected to a single interconnect on the host side and allow both SVCs operating in initiator mode, together with multiple devices, to be interconnected on the device side.

The configuration pictured in FIG. 1 suffers from the drawback that a malfunction of a single PSD 1005, depending on the nature of the malfunction, could potentially bring down an entire device-side IO device interconnect making all other PSDs 1005 connected on the same interconnect inaccessible.

Figure 2:
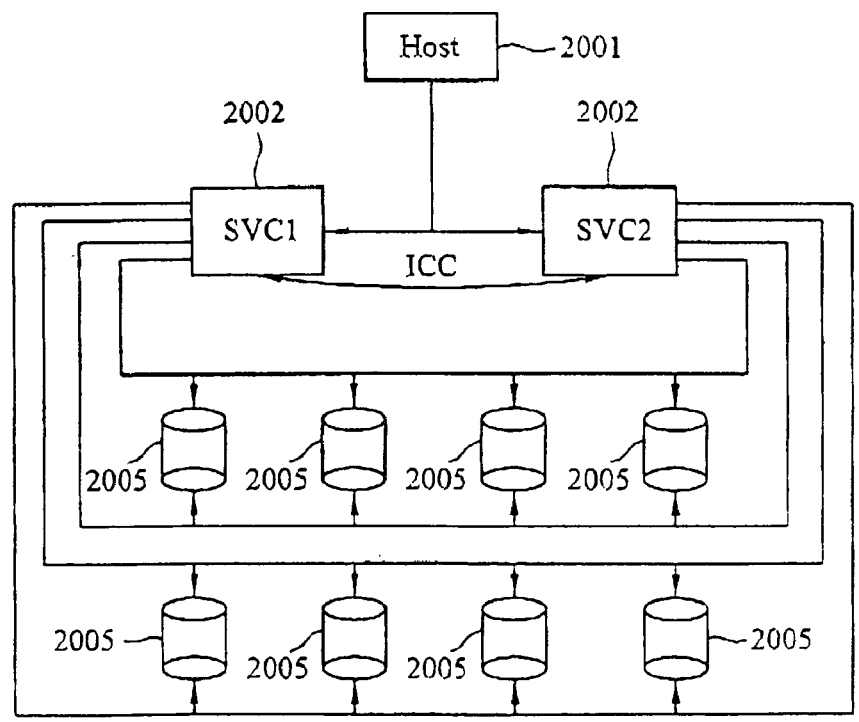
FIG. 2 illustrates a block diagram of another redundant storage virtual subsystem implementation.

FIG. 2 is a block diagram of another redundant SVS implementation 2000. The SVS 2000 comprises two storage virtualization controllers (SVCs) SVC1 and SVC2 2002, and a plurality of physical storage devices (PSDs) 2005 connected thereto through four device-side IO device interconnects, with each PSD 2005 connected to two device-side IO device interconnects. An inter-controller communications channels (ICC channel) is implemented between the two SVCs. The SVCs 2002 are connected to a host entity 2001 through the host-side IO device interconnects. FIG. 2 diagrams an improvement on the configuration in FIG. 1 that effectively avoids the possibility that access to other PSDs 2005 connected on the same device-side IO device interconnect might be disrupted due to a malfunction that causes a single device-side interconnect to fail by making use of dual-ported PSDs 2005 and adding an additional interconnect to each PSD 2005. In this way, the blockage of a single device-side IO device interconnect, possibly caused by a malfunction of the interconnect controller IC on the PSD 2005, would not result in the inaccessibility of other PSDs 2005 connected on the same interconnect, for the second interconnect connected to each of the same PSDs 2005 can be used to access those PSDs 2005 without interference.

The configuration pictured in FIG. 2 has the further advantage that IO request load can be distributed between the redundant device-side interconnects thereby effectively doubling the overall bandwidth of the device-side IO device interconnect subsystem as compared to the single-interconnect-per-PSD-set configuration. In this case, the device-side 10 device interconnect of choice would typically be Fibre FC-AL because of the dual-ported nature of Fibre FC-AL PSDs currently on the market and the elements of the Fibre protocol that allow an initiator, such as an SVC, to determine which interconnect IDs on different interconnects correspond to the same PSD.

While the configuration depicted in FIG. 2 is, indeed, far more robust than that depicted in FIG. 1 in the face of device-side IO device interconnect failure, there is still the possibility that a PSD 2005 might malfunction in such a way that it could bring down both IO device interconnects that are connected to its dual-ported port pair. Were this to happen, once again, access to other PSDs 2005 connected on the same interconnect pair would be disrupted. In a LMU that consists of a standard singly-redundant RAID combination of PSDs 2005 (e.g., RAID 5), this could prove disastrous for it could cause multiple PSDs 2005 in the combination to go off line causing the entire LMU to go off line.

Figure 3:
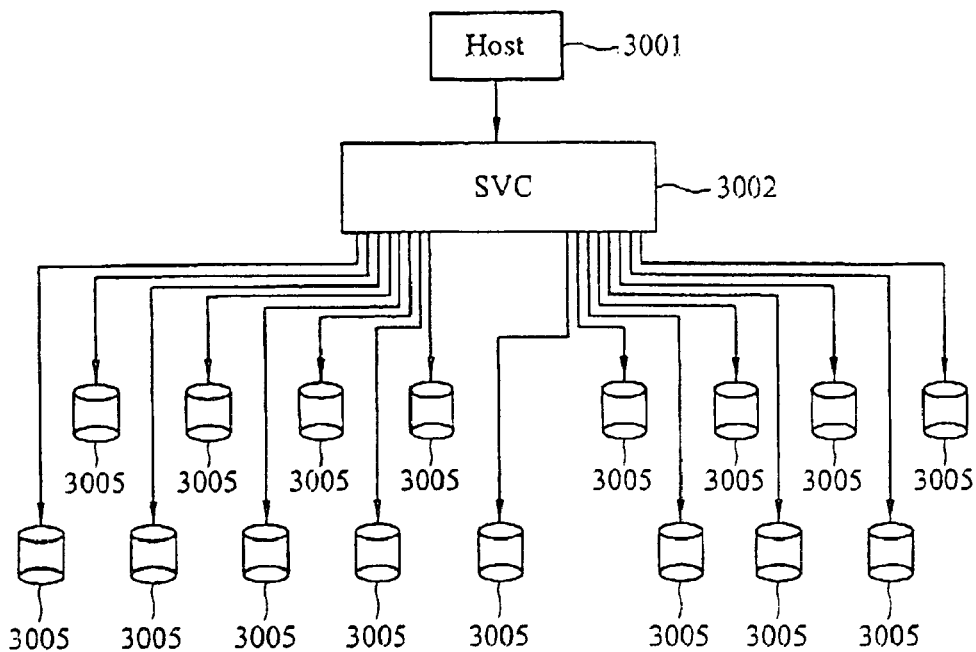
FIG. 3 depicts a non-redundant storage virtualization subsystem configuration.

FIG. 3 depicts a non-redundant Storage Virtualization Subsystem configuration in which each PSD 3005 is serviced by a dedicated device-side IO device interconnect used to connect each PSD 3005 to the SVC 3002. A host entity 3001 is connected to the SVC 3002 with a host-side device interconnect. Such a configuration is necessary for single-device point-to-point IO device interconnects such as Serial ATA. This configuration offers two distinct advantages over multiple-device IO device interconnects connecting to multiple devices. The first advantage is in robustness against IO device interconnect failure. A malfunction in a PSD 3005 or interconnect at most only affects the single interconnect and/or connected-PSD 3005. All other PSDs 3005 remain fully accessible for they are serviced by their own dedicated IO device interconnects that connect the PSDs 3005 to the SVC 3002. The second advantage is fully scalable performance. In the configurations depicted in FIGS. 1 and 2 in which multiple PSDs 1005/2005 share a single interconnect, the addition of PSDs allows performance only to scale up to a maximum of the single interconnect bandwidth, beyond which the further addition of PSDs 1005/2005 does not yield any further improvement in performance.

In the configuration depicted in FIG. 3 in which each PSD 3005 is serviced by a dedicated interconnect, performance of the device-side subsystem consisting of all of the interconnect and/or PSDs 3005 scales up endlessly with the number of PSD 3005 and/or interconnects added. However, using common standard multiple-device IO device interconnects such as Parallel SCSI or Fibre in a dedicated interconnect per PSD 3005 configuration as that illustrated in FIG. 3 is not cost effective due to the relatively high cost-per-port of such interconnects. The advent of relatively low cost-per-port Serial ATA IO device interconnect, however, brings cost-effectiveness to this kind of configuration.

Figure 4:
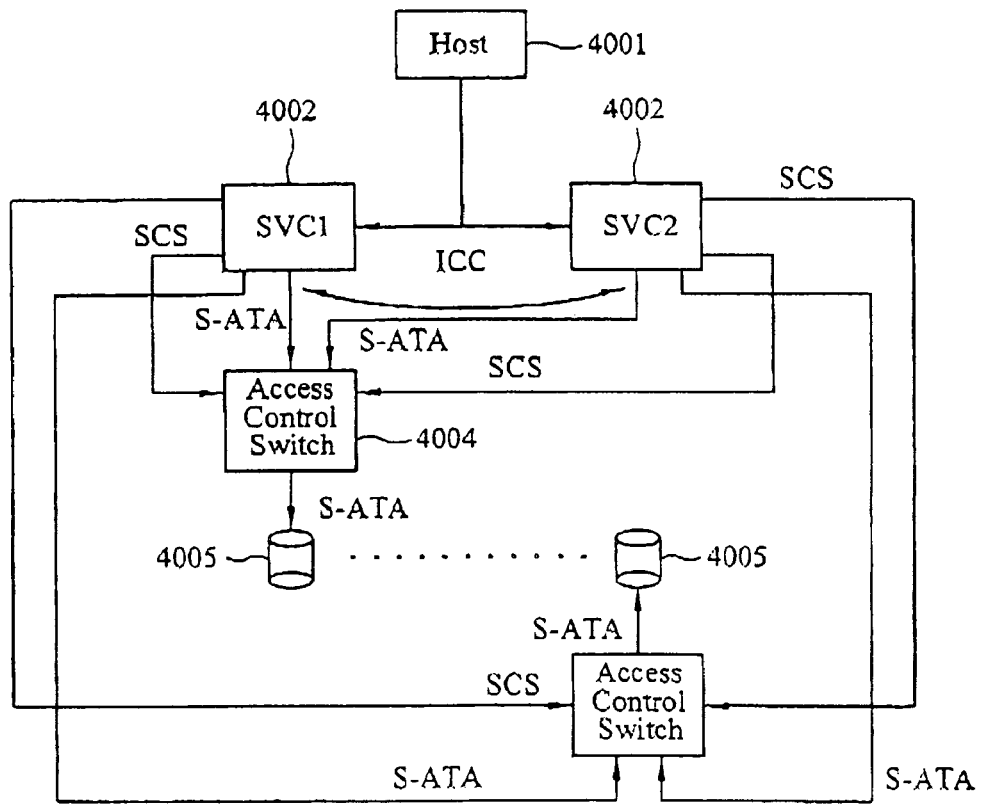
FIG. 4 depicts another redundant storage virtualization subsystem configuration.

FIG. 4 depicts a redundant Storage Virtualization Subsystem 4000 configuration incorporating dedicated single-device, point-to-point IO device interconnects to connect all PSDs 4005 to both SVCs (SVC1 and SVC2 4002). In order to allow both controllers to access the same PSD 4005, a switching circuit, hereafter referred to as an "access control switch 4004", is inserted in the device-side IO device interconnect path between the SVCs and the PSD 4005. Because of the point-to-point nature of the interconnect, only one SVC, the SVC to which the particular PSD is assigned at the time, can be actively accessing the particular PSD at a time. The other SVC remains in a stand-by mode with respect to this PSD with its IO device interconnect to the particular PSD disabled.

Figure 6:
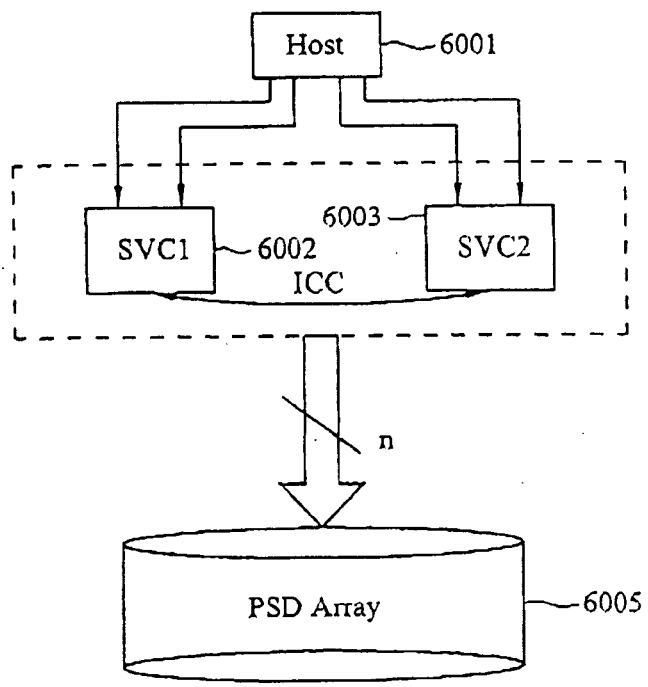
FIG. 6 shows a configuration that can be adopted in implementations in which the hosts implement multi-pathing functionality according to an embodiment of this invention.

By incorporating dedicated interconnects per PSD 4005, the redundant SVS 4000 depicted in FIG. 4 effectively avoids the possible consequences of a break or blockage in a device-side IO device interconnect, possibly due to a failed PSD 4005, resulting in loss of access to multiple PSDs 4005. On the host side, the failure of a single host-side IO device interconnect, possibly due to a SVC malfunction, could also result in the blockage of the entire interconnect thereby resulting the loss of access to the SVC(s) through that interconnect. The typical solution employed to get around this is to provide multiple redundant paths to sections of LMUs presented by the SVCs by presenting sections of LMUs to the hosts on more than one host-side interconnect. Such implementation is depicted in FIG. 6.

In a typical redundant SVS, each LMU presented to the host will be assigned to one or the other SVC for the purpose of processing host IOs. This is because, in the process of processing a host 10, there are certain operations that, with respect a particular LMU, must be performed "atomically", meaning without interruption by other operations that might modify a relevant state. This typically requires coordination between different threads that are processing IOs addressing the same LMU. When these threads execute on a single SVC, inter-thread coordination can be done simply and efficiently such as not to result in significant performance degradation. However, if these threads were executing on different SVCs, inter-SVC communication would have to be frequently called upon to effect inter-thread coordination. This would not only increase the complexity of the design considerably, it would typically result in significant performance degradation. In fact, the performance degradation that resulted would typically far exceed the performance improvement achieved due to having the redundant SVCs run in active-active mode to begin with.

Here, processing of host IOs as it relates to LMU assignment typically would include data cache operations relating to the processing of the particular IO and operations relating to the virtualization process that maps the LMU to physical devices. Data cache operations consist of such things as:

(a) Searching the cache for data being accessed by a host IO.

(b) If there are certain portions of the IO-associated data for which there is currently no cache buffer assigned to store it, allocating cache buffers for this function.

(c) If data to be read is not in the cache, initiating IO requests to read the data into the cache from the LMU.

(d) Commencing the process of transferring IO-associated data to/from the host from/to the cache buffers assigned to store the IO-associated data.

(e) For writes, if write-through mode is indicated, initiating IO requests to write the data to the LMU from the cached image.

LMU virtualization consists of such things as:

(a) Mapping LMU IO operations to physical device operations. This might involve splitting portions of LMU IO operations into multiple physical device IO operations and/or combining portions of different LMU IO operations into single PSD operations.

(b) Generating redundant data, such as RAID parity data, and writing it to the appropriate locations on the appropriate PSDs.

(c) Regenerating data that cannot be recovered from a particular PSD, perhaps because the PSD has failed or is not present, from redundant data, perhaps by combining it with data on other PSDs.

(d) Restoring data on a PSD to a state that is consistent with data on other PSDs, referred to here as PSD Data Reconstruction. This would be necessary, for instance, if a PSD is replaced thereby necessitating that the PSD data be reconstructed.

(e) Rearranging data and regenerating redundant data as needed on PSDs in response to a change in LMU configuration, referred to here as LMU Configuration Modification. Adding drives to the LMU and restriping to include the new drives or changing RAID levels would necessitate such an operation.

In this list, there are LMU virtualization operations that are not directly involved in the processing of host IOs (e.g., PSD Data Reconstruction or LMU Configuration Modification) that, nevertheless, require that they be performed on the same SVC that is responsible for processing host IOs (the SVC to which the LMU is currently assigned) to avoid excessive inter-controller coordination.

Figure 5:
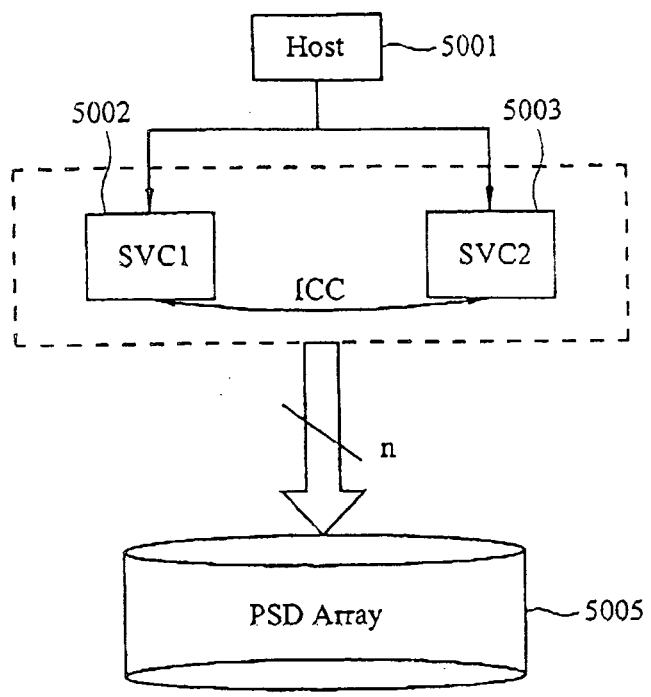
FIG. 5 depicts a redundant storage virtualization subsystem configuration incorporating multiple-device IO device interconnects to connect the host entity to both SVCs according to an embodiment of this invention.

Because LMUs are typically assigned to one SVC or the other for the purpose of host IO processing, it is necessary for each host to have a path over which it can access sections of LMU presented to it through the SVC to which that LMU is assigned. The simplest way to accomplish this when the host-side IO device interconnects are of the multiple device variety is to interconnect the host-side interconnects of the two SVCs as shown in FIG. 5. With bus-style interconnects, such as parallel SCSI, this can typically be accomplished without any extra circuitry, while with other varieties of interconnects, such as Fibre, switching circuitry may be needed to accomplish this interconnection. In this configuration, the host(s) 5001 can access any section of the LMU (which is combined from sections of PSD Array 5005) presented by the SVS 5000 independent of which SVC is presenting it. This configuration is especially important in implementations in which the host 5001 does not have special software running on it that allows it to intelligently switch between redundant access paths in the event that a path no longer provides access to a particular LMU (referred to here as "multi-pathing functionality"), for it allows continued access to LMUs through the on-line SVC (e.g., SVC1 5002) in the event that the SVC (e.g., SVC 2 5003) to which the LMU was originally assigned goes off line. An SVC can take over for its mate by taking over the IO device interconnect IDs that would normally be presented onto the interconnect by its mate and mapping sections of LMUs to these IDs in the same way its mate would. This kind of redundant SVC configuration is typically referred to as "transparent" redundancy and the takeover mechanism "transparent" takeover, for the host needn't be made aware when one SVC takes over IO processing from the other SVC.

FIG. 6 shows an alternate configuration that can be adopted in implementations in which the host(s) 6001 implement multi-pathing functionality. In this configuration, if the SVC to which a particular LMU is assigned goes off-line (or LMU assignment is just changed from one SVC to the other), the multi-pathing functionality on the host 6001 will automatically take care of rerouting IOs from the interconnect that connects the host 6001 to the off-line SVC over to the interconnect connecting the host to the on-line SVC. This configuration has the advantage of not requiring switch circuitry to interconnect the host-side IO device interconnects of the two SVCs 6002, 6003, thereby reducing the number of active, and therefore failure-prone, components and, at the same time, reducing cost of the SVC. However, in this configuration, at least two host-side IO device interconnect ports per SVC are required increasing the cost of implementation on the host side. In addition, the hosts themselves must each provide the same number of host ports as that of the host-side ports on each of the SVCs, which increases the cost of implementation of the host platform as well.

By incorporating dedicated interconnects or multiple-redundant interconnects per PSD, the redundant SVS depicted in FIGS. 2 and 4 eliminates the risk that a break or a blockage in one of the device-side interconnects would lead to loss of access to multiple PSDs potentially resulting in an LMU going off-line. On the host side, the failure of a single host-side IO device interconnect, possibly due to break in the cable connection that forms a portion of the physical interconnect, could also result in the failure of the entire interconnect thereby resulting in the loss of access to the SVC(s) through that interconnect.

Figure 7:
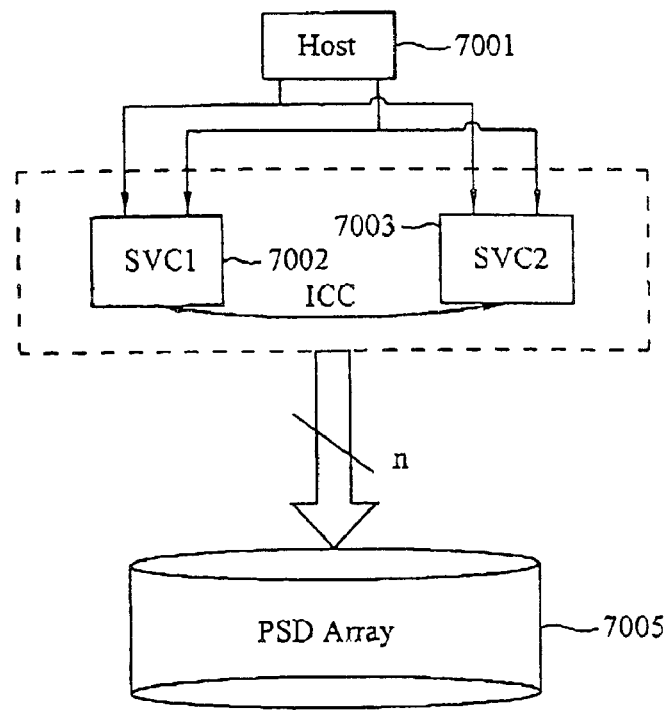
FIG. 7 shows a configuration implementing multiple redundant paths in host-side IO device interconnects according to an embodiment of this invention.

One configuration typically employed to eliminate the risk of loss of access to LMUs due to break or blockage of a single host-side IO device interconnect is multiple redundant paths illustrated in FIG. 7. In this configuration, there are at least two interconnects over which sections of LMUs presented to the host(s) 7001 can be accessed so that if one interconnect were to break or become blocked, the host could still access sections of the LMU over the alternate interconnect on the same SVC. This, of course, requires muli-pathing functionality described above to be implemented on the host to effect the rerouting of IOs should access to a section of a LMU over a particular host-side interconnect be lost.

In the configurations illustrated in FIGS. 7 and 6, there are two host-side interconnect ports per SVC. These two ports on a single SVC form a redundant port complement over which sections of LMUs assigned to the SVC can be accessed via either port. Should one interconnect break or become blocked or should a port malfunction, access to the LMU sections can still ensue over the complementary port. Note once again, the trade off between the two configurations shown in FIGS. 7 and 6. In FIG. 7, the host-side interconnects of the two SVCs are interconnected which may require active switch circuitry and allows only for aggregate host-side interconnect bandwidth to the SVCs of half of the accumulated bandwidth of both SVCs host-side interconnect ports. In FIG. 6, each of the host-side interconnect ports on the SVC connects to a host interconnect port with a dedicated interconnect allowing interconnect bandwidth to scale directly with the number of SVC ports, but at an increased cost of the host platform due to larger number of host ports.

While a redundant SVC implementation with each SVC equipped with a pair of ports for the purpose of port redundancy achieves the intended goals, it suffers from the drawback of being costly, both in terms of excessive SVC port count and in terms of either switch circuitry required for certain IO device interconnect types such as Fibre FC-AL to interconnect the complementary ports on the two SVCs or in terms of increased port count on the host.

Figure 8:
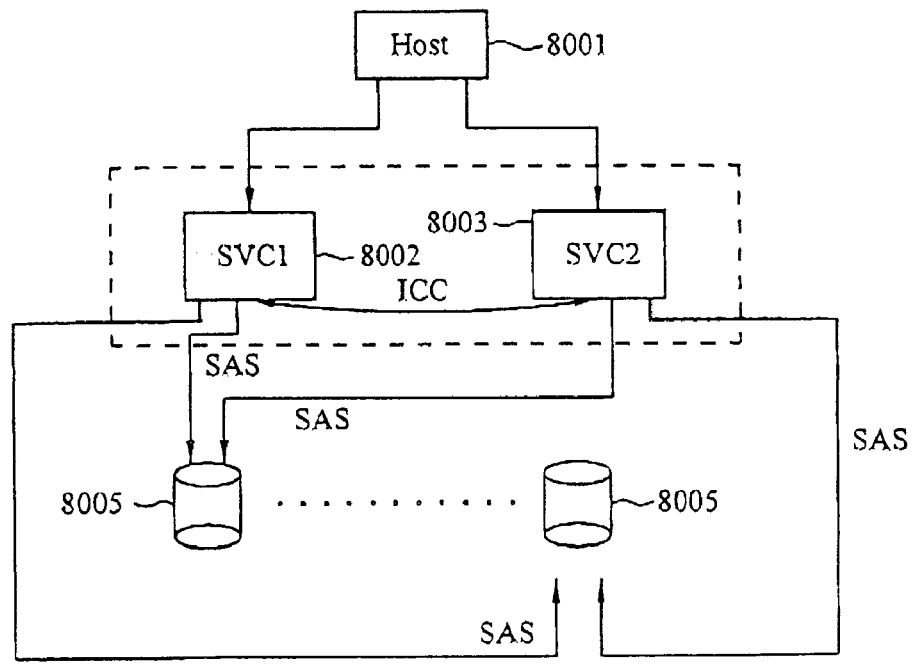
FIG. 8 shows an embodiment of the computer system configuration implemented with split redundant paths between the host entity and the SVS according to this invention.
Figure 9:
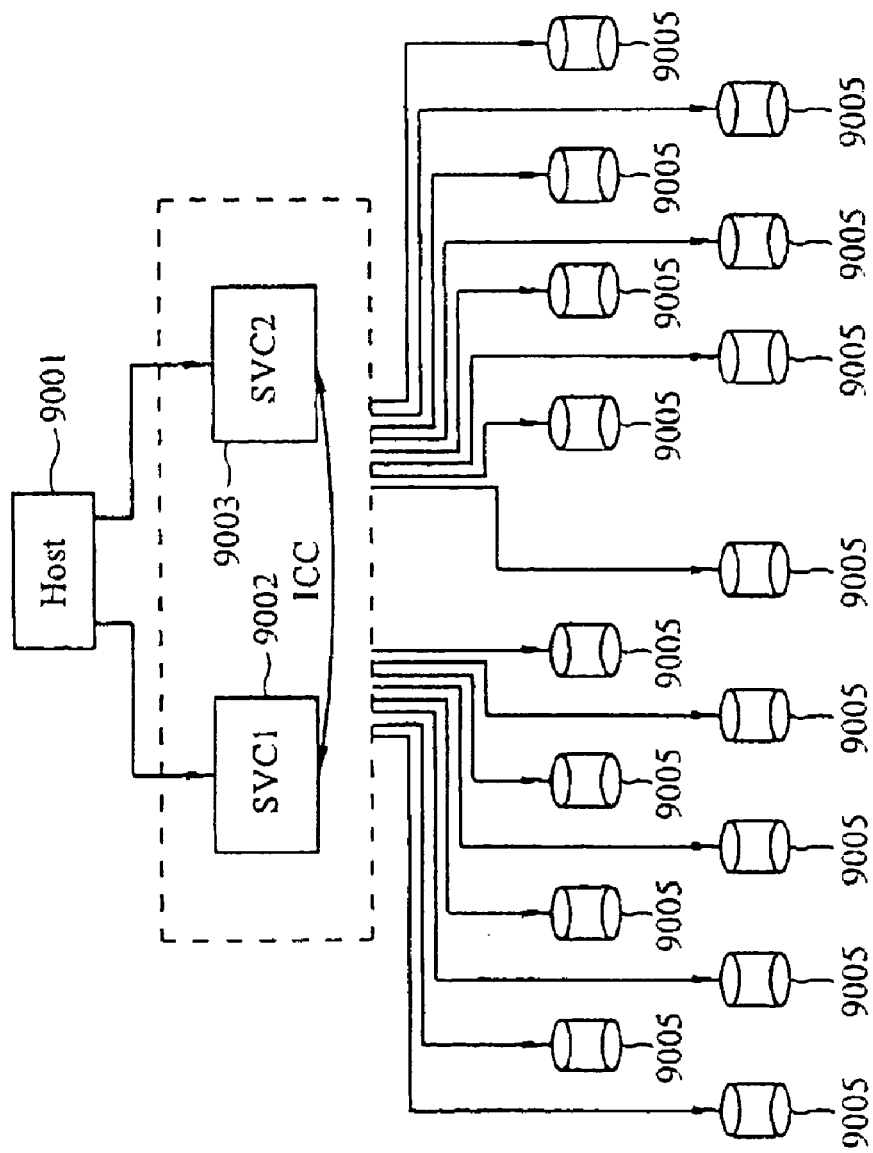
FIG. 9 shows another embodiment of the computer system configuration implemented with split redundant paths between the host entity and the SVS according to this invention.

FIG. 8 and FIG. 9 each show an implementation that effectively halves the number of required ports on the SVCs and eliminates the need for interconnection between host-side interconnects and its accompanying switch circuitry. In FIG. 8 and FIG. 9 each, each SVC is connected to the host entity with a host-side port of the SVC connected to a host port of the host entity through a host-side IO device interconnect. In FIG. 8, dual-ported SAS PSDs are used as shown, while in FIG. 9, single-ported PSDs are used. It basically combines the complementary aspect required for redundancy of controller and redundancy of ports into a single pair of ports, one per SVC. In this implementation, sections of LMUs are presented to the host(s) on the host-side IO device interconnects by both SVCs. This configuration is an example of what is referred to hereafter as split redundant paths, meaning that there is one, and only one, path on each SVC in a redundant SV subsystem to any one section of an LMU that is presented to the host. In such a configuration, because LMUs or sections thereof are presented to the host(s) by both SVCs, the host(s), at any time, perhaps due to a perceived path failure, could start rerouting IOs to the SVC to which the addressed LMU is not currently assigned.

The current invention further defines a functionality herein referred to as "host-side IO rerouting" in which IOs received by a SVC to which the addressed LMU is not assigned are rerouted by the SVCs themselves to the SVC to which the addressed LMU is assigned. The SVC to which the addressed LMU is assigned is referred to hereafter as the LMU Owner. This rerouting would typically take place over the inter-controller communication channel (abbreviated ICC channel) that serves as the primary medium of communication between the two SVCs.

Figure 10:
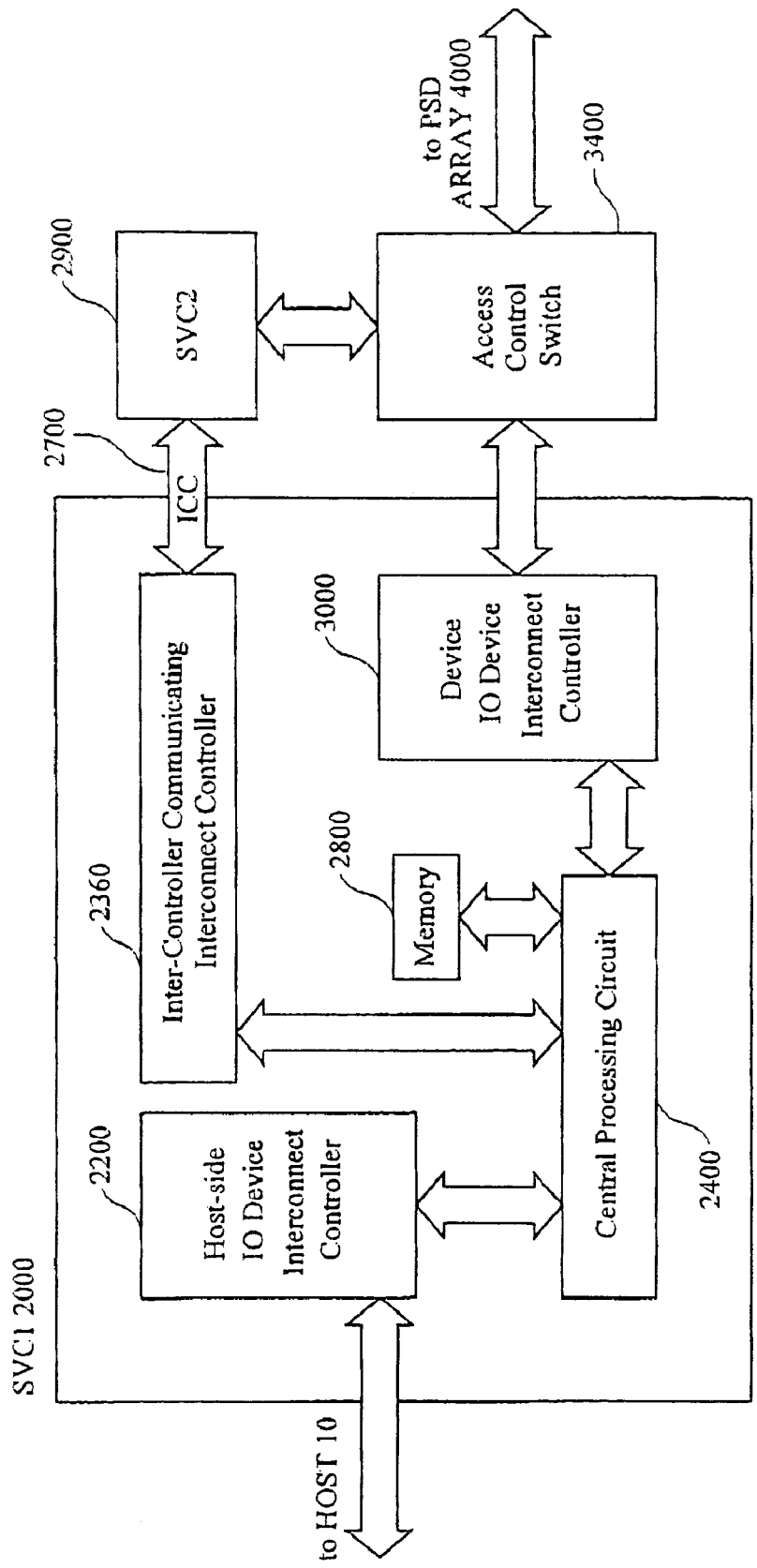
FIG. 10 shows an embodiment of two SVCs implemented with an ICC channel controller and connected together by an ICC channel with the main functional blocks of the SVCs according to this invention.

An example of two SVCs implemented with an ICC channel (or interconnect) controller and connected together by an ICC channel 2700 with the main functional blocks of the SVCs disclosed is shown in FIG. 10. In this example, the SVC1 2000 comprises a host-side IO device interconnect controller 2200, a central processing circuit (CPC) 2400, a memory 2800, a device-side IO device interconnect controller 3000, and an inter-controller communicating interconnect controller 2360. Although illustrated in separate functional blocks, some or all of these functional blocks can be incorporated into to one chip. For example, the ICC interconnect controller can be integrated with either the host-side IO device interconnect controller or the device-side IO device interconnect controller, or even both, into a single-chip IC.

The host-side IO device interconnect controller 2200 is connected to the host entity 10 and the CPC 2400 to serve as an interface and buffer between the SVC1 2000 and the host entity, and receives IO requests and related data from the host entity 10 and maps and/or transfers them to the CPC 2400. The host-side IO device interconnect controller 2200 comprises one or more host-side ports for coupling to the host entity 10. Some common port types that might be incorporated here are: Fibre Channel supporting Fabric, point-to-point, public loop and/or private loop connectivity in target mode, parallel SCSI operating in target mode, ethernet supporting the iSCSI protocol operating in target mode, Serial-Attached SCSI (SAS) operating in target mode, and Serial ATA operating in target mode. The device-side IO device interconnect controller 3000 and the ICC interconnect controller 2360 each comprises one or more ports supporting in target and/or initiator mode protocols such as those supported by the host-side ports of the host-side IO device interconnect controller 2200 for communicating with other devices connected thereto.

The CPC 2400 mainly comprises CPU and CPU chipset for handling and/or monitoring the IO request processing and LMU virtualization operations. When the CPC 2400 receives the IO requests of the host entity 10 from the host-side IO device interconnect controller 2200, CPC 2400 parses it and performs some operations in response to the IO requests and sends the data requested and/or reports and/or information of the SVC1 2000 back to the host entity 10 through the host-side IO device interconnect controller 2200.

After parsing a request received from the host entity 10, while a read request being received and performing one or more operations in response, the CPC 2400 get the requested data either internally or from the memory 2800, or in both ways, and transfers them to the host entity 10. If the data is not available either internally or does not exists in the memory 2800, the IO request will be issued to the PSD array 4000 through the device-side IO device interconnect controller 3000 and the switching circuit. The requested data will then be transferred from the PSD array 4000 to the memory 2800 and passed to the host entity 10 through host-side IO device interconnect controller 2200.

When a write request is received from the host entity 10, after parsing the request and performing one or more operations, the CPC 2400 gets the data from the host entity 10 through the host-side IO device interconnect controller 2200, stores them in the memory 2800, and then transmits the data to the PSD array 4000 through the CPC 2400. When the write request is a write back request, the IO complete report can be issued to the host entity 10 first and then the CPC 2400 performs the actual write operation later; otherwise, an IO complete report can be issued to the host entity 10 after the requested data is actually written into the PSD array 4000.

The memory 2800 is connected to the CPC 2400 and acts as a buffer to buffer the data transferred between the host entity 10 and the PSD array 4000 through the CPC 2400. In one embodiment, the memory 2800 can be a DRAM; or more particularly, the DRAM can be a SDRAM.

The device-side IO device interconnect controller 3000 connected between the CPC 2400 and the PSD array 4000. It serves as an interface and buffer between the SVC1 2000 and the PSD array 4000 and receives IO requests and related data issued from CPC 2400 and maps and/or transfers them to the PSD array 4000.

In this example, the ICC interconnect controller 2360 is implemented in SVC1 2000 to connect the CPC 2400 to SVC2 2900. In addition, the device-side IO device interconnect controller 3000 is connected to the PSD array 4000 through the access control switch 3400. The access control switch 3400 is also connected to the SVC2 2900. The PSD array 4000 can be accessed by the two SVCs 2000 and 2900 through the access control switch 3400. Moreover, the control/data information from the host 10 can be transferred from the CPC 2400 through the RCC interconnect controller 2360 to the SVC2 2900 and further to a second PSD array (not shown). Note that, the access control switch 3400 is only required for point-to-point, single-ported PSOs, such as SATA PSDs, when two IO device interconnects are connected to the single port of the PSD.

An embodiment of the computer system configuration implemented with a SVS comprising such access control switch and single-ported PSDs is depicted in FIG. 9. While, on the other hand, a dual-ported PSD, such as a SAS PSD, is used with one port of the port pair connected to the SVC1 and the other port of the port pair connected to the SVC2 each through a separate IO device interconnect, the access control switch 3400 is not required. An embodiment of the computer system configuration implemented with a SVS comprising such dual-ported PSDs is depicted in FIG. 8.

Figure 11A:
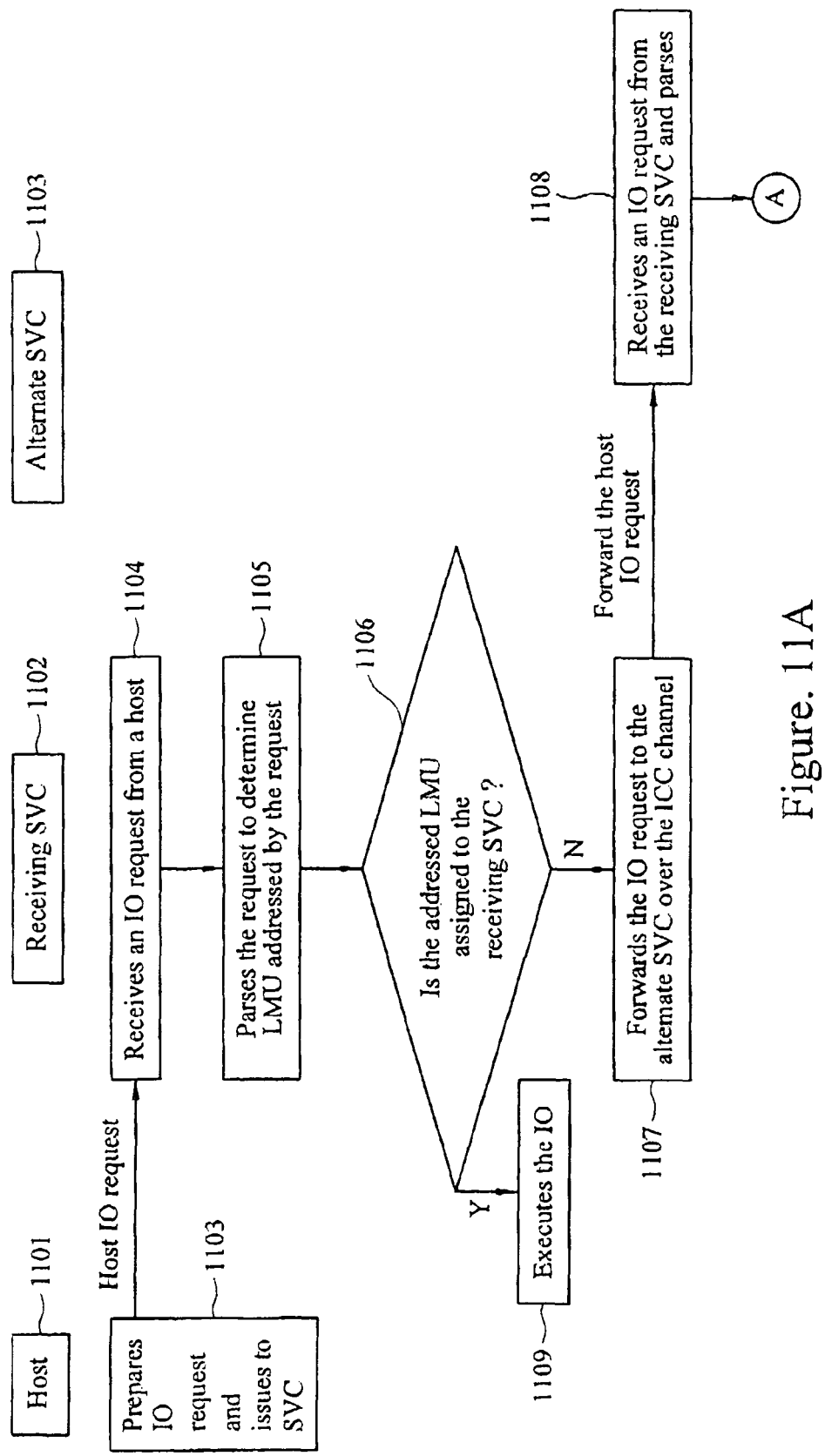
FIGS. 11A-11C show a flow chart illustrating an embodiment of the host IO routing process according to this invention.

One embodiment of the host-side IO rerouting process might be as follows. Please also refer to FIGS. 11A, 11B and 11C. The host 1101 prepares IO request and issues it to SVC in step 1103. When an IO request is received from the host 1101 in step 1104, the "receiving SVC 1102" parses it to determine the LMU addressed by the request in step 1105. In step 1106, if the addressed LMU is assigned to the "receiving SVC 1102", it executes the IO directly in step 1109. In step 1106, if it addresses an LMU assigned to the alternate SVC 1103, it forwards the IO request over to the alternate SVC 1103 over the ICC channel in step 1107. On receipt of the IO request, the alternate SVC 1103 parses the IO request in step 1108.

Figure 11B:
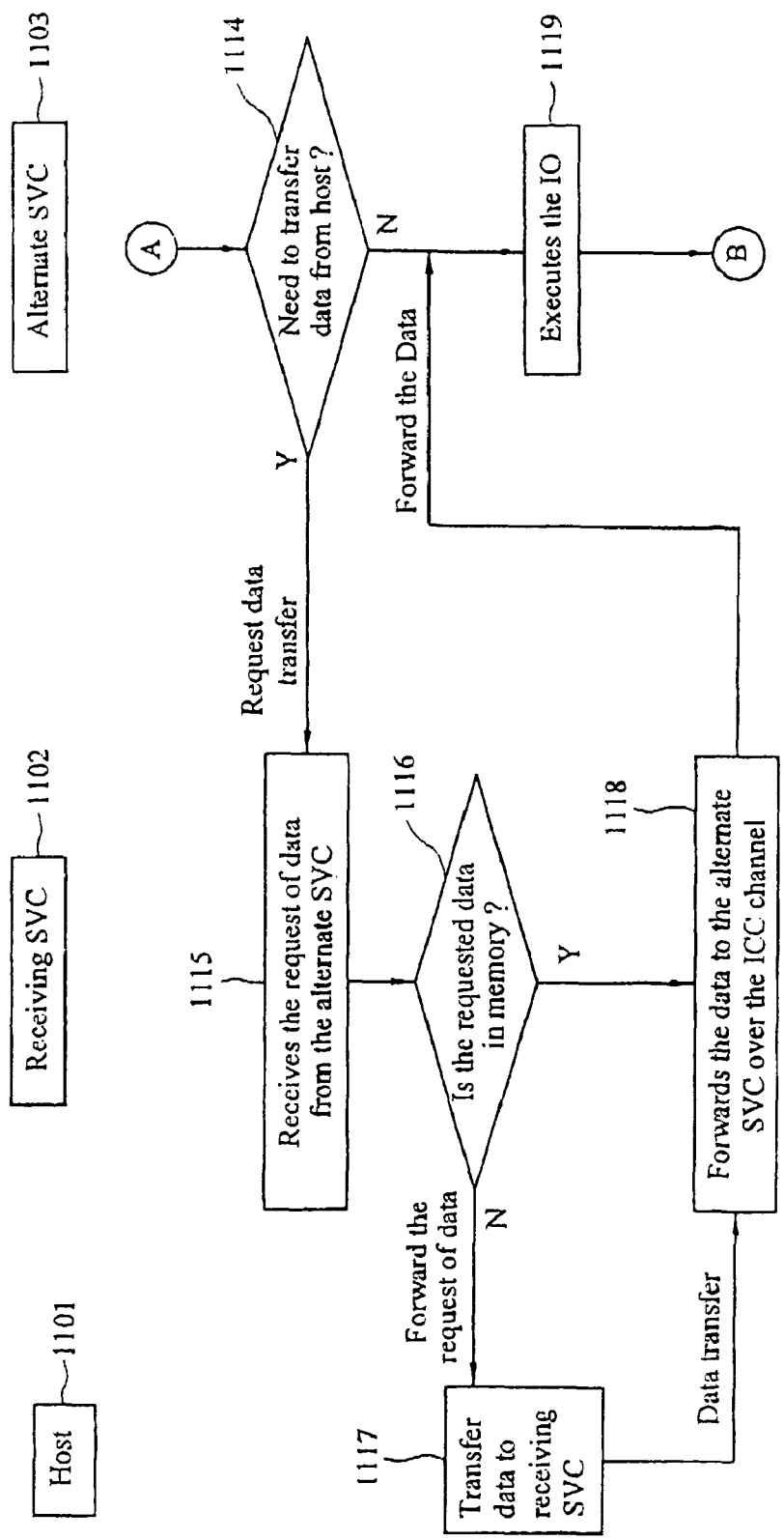
Figure 11C:
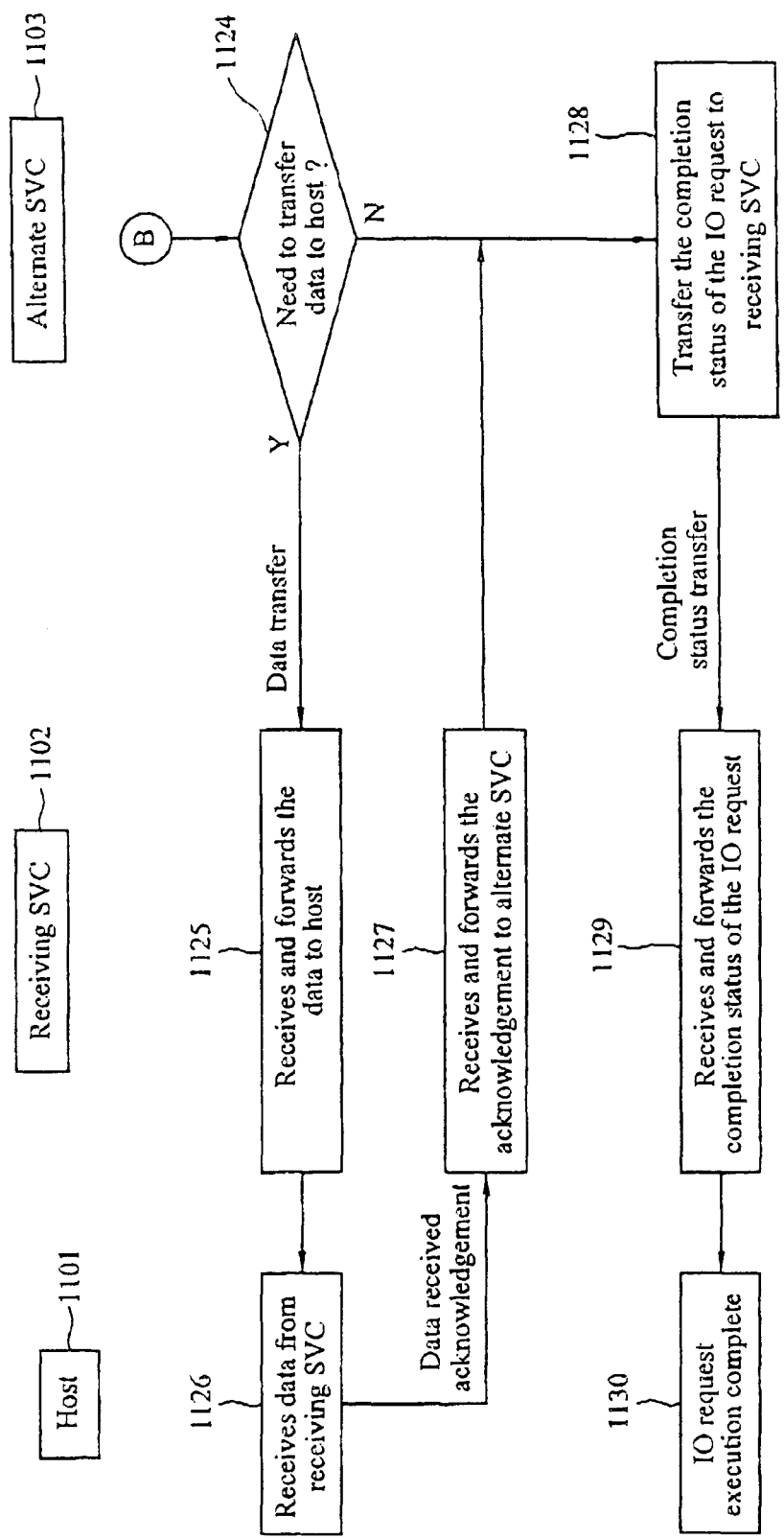

In FIG. 11B, If the request requires that data be transferred from the host as in a WRITE request in step 1114, the alternate SVC 1103 requests the data from the "receiving SVC 1102" in step 1115. The "receiving SVC 1102" may have already transferred some or all of the data from the host into buffers in its memory or it may wait for the data transfer request from the alternate SVC 1103 before commencing transfer of data from host. When the receiving SVC 1102 receives data request from the alternate SVC 1103, it will check if the requested data is in the memory in step 1116. If the requested data is not in memory, the receiving SVC 1102 will forward the request of data to the host which issued the request and wait for the data transferring from the host in step 1117. The data is then forwarded to the alternate SVC 1103 over the ICC channel in step 1118. The IO request is then executed by the alternate SVC 1103 in step 1119. During or on completion of execution of the IO request, if data is to be transferred to the host as in a READ IO request in step 1124, the alternate SVC 1103 forwards the data to be transferred to the host to the "receiving SVC 1102". The "receiving SVC 1102" forwards this data to the host over the host-side IO device interconnect over which the IO request was received in step 1125. After the host entity 1101 receives the data from the receiving SVC 1102 in step 1127, acknowledgement notifying that data has been received is sent to the receiving SVC 1102. After the acknowledgement is received by the receiving SVC 1102, it is forwarded to the alternate SVC 1103 in step 1127. On IO request completion, the completion status of the IO request is forwarded to the "receiving SVC 1102" by the alternate SVC 1103 in step 1128 and then forwarded on to the host after all data to be transferred to the host as part of the IO request has been transferred in step 1129. The IO request execution is then complete in step 1130.

Implementation of host-side IO rerouting as described above can allow for support of configurations that reduce system cost and complexity by reducing the number of host-side IO device interconnects necessary to achieve SVC redundancy and multiple redundant paths to each LMU. However, if IO requests are routed by the host-based multi-pathing function over IO device interconnect paths that consistently result in the rerouting of the request because the addressed LMU is assigned to the alternate SVC 1103, significant IO performance degradation could result. This could happen if the interconnects that form the paths to the SVC to which the addressed LMU is assigned (referred to as "primary paths") break, become blocked or otherwise malfunction or just simply if the multi-pathing functionality of the host 1101 is not aware of the primary paths and, as a result, routes IOs over alternate ones. In the latter case, if the host supports a method by which a primary path could be specified such that IO requests are routed over that path until the LMU can no longer be accessed over that path, then the host could be pre-configured to send IOs addressing a particular LMU out over the interconnect that connects the host to the SVC to which the addressed LMU is assigned thereby eliminating the need to reroute. Alternately, each LMU could be pre-configured on the SVS to be assigned to the SVC that is connected to the interconnect over which the host is most likely to send IO requests.

The disadvantage with the above approach to minimize the frequency with which IO requests must be rerouted to the alternate controller is that it entails pre-configuration which would typically require taking the system off-line then bringing it back on-line for modifications in configuration to take effect. It, therefore, does not adapt well to a dynamically changing environment. A more sophisticated approach is to support the dynamic reassignment of LMUs to SVCs.

Figure 12A:
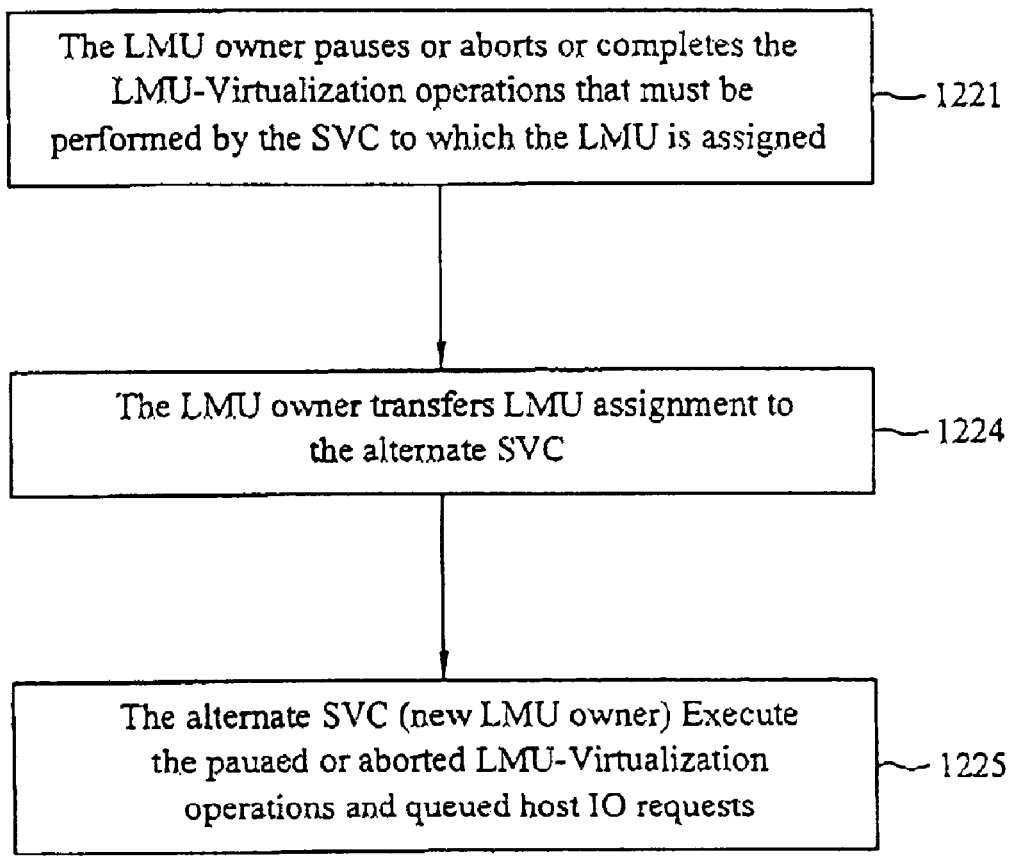
FIG. 12A depicts the flow chart illustrating an embodiment of main operations of the dynamic LMU reassignment process according to this invention.

Please also refer to FIG. 12A. Dynamic LMU reassignment would typically entail the following operations: LMU Virtualization operations that must be performed by the SVC to which the LMU is assigned (e.g., PSD Data Reconstruction) are paused or aborted or completed in step 1221. LMU assignment is transferred to the alternate SVC in step 1224, LMU Virtualization operations that were paused or aborted are continued or restarted and queued host IO requests executed in step 1225. Note that, the entire reassignment process is performed while the SVS is on line, and this what the dynamic LMU reassignment means.

In the simplest embodiment, the LMUs could be dynamically reassigned by user configuration without the need for reinitializing either of the SVCs. If the user notes an excessive frequency of IO rerouting for a particular LMU, he could manually reassign the LMU to the alternate SVC in an attempt to reduce the frequency while the SVCs remain on-line.

In another embodiment, LMU reassignment would be automatically performed based on statistics that keep track of through which SVC IO requests addressing the LMU are received. If an SVC (referred to as the "receiving SVC") receives an IO addressing an LMU that is currently assigned to the alternate SVC, a LMU reassignment operation to change assignment of the LMU from the alternate SVC to the "receiving SVC" would be performed prior to processing the IO. The IO would then be processed by the "receiving SVC" while the LMU is assigned to it. Note that, in this embodiment, split redundant pathing can be achieved without calling upon host-side IO rerouting, for rather than sending IOs over to the SVC to which the LMU is currently assigned, the LMU is reassigned over to the SVC that is receiving IOs.

Figure 12B:
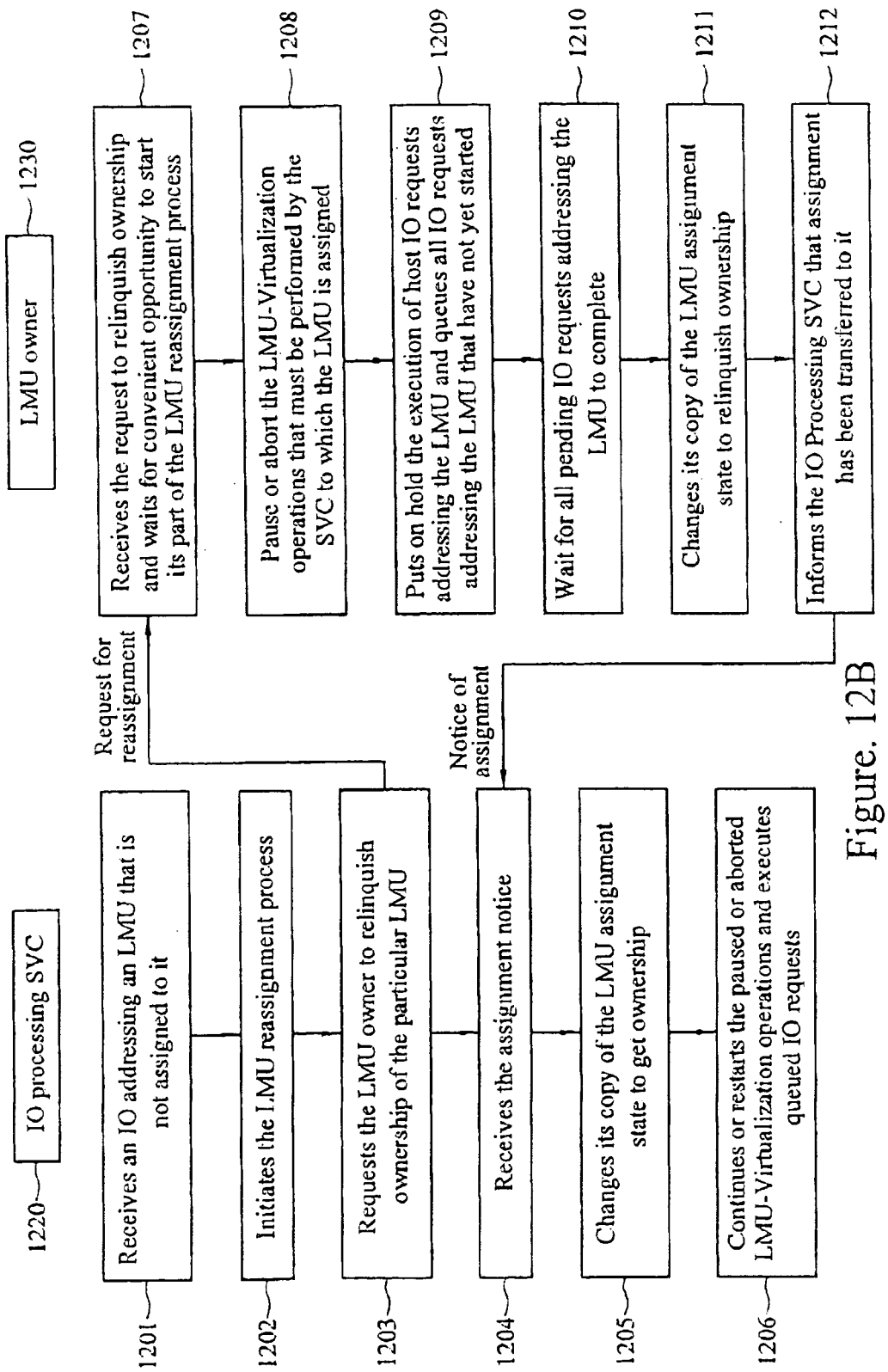
FIG. 12B depicts a flow chart illustrating an embodiment of a typical LMU reassignment process according to this invention.

A typical reassignment process in this embodiment is depicted in the flow chart in FIG. 12B. When an IO is received that addresses an LMU that is currently assigned to the alternate SVC (referred to hereafter as the LMU Owner 1230) in step 1201, the receiving SVC (referred to here as the "IO processing SVC" 1220) initiates the LMU reassignment process in step 1202. This process starts by requesting the LMU owner 1230 to relinquish "ownership" of the particular LMU in step 1203. The receiving SVC then queues any IO requests addressing the LMU received in the process of LMU reassignment before it get the LMU ownership. The LMU Owner 1230 then waits for an "appropriate" opportunity to start its part of the LMU reassignment process in step 1207. This process typically entails pausing or aborting LMU Virtualization operations that must be performed by the SVC to which the LMU is assigned (e.g., PSD Data Reconstruction) in step 1208 and allowing any pending IO requests addressing the LMU to complete while putting on hold the execution of host IO requests addressing the LMU and queuing any IO requests addressing the LMU that have not yet started in step 1209. When such LMU virtualization operations are paused or aborted and all pending requests addressing the LMU have completed in step 1210, the LMU Owner 1230 changes its copy of the LMU assignment state to indicate that the LMU is no longer assigned to it in step 1211. This might include modifying data cache control structures to relinquish ownership of cache data and resources associated with the LMU. The LMU Owner 1230 now informs the "IO Processing SVC 1220" with an assignment notice that assignment has been transferred to it in step 1212. After the IO Processing SVC 1220 receives the assignment notice in step 1204, it changes its copy of the LMU assignment state to indicate that the LMU is now assigned to it in step 1205. This also might involve modifying its own data cache control structures to take over ownership of cache data and resources associated with the LMU. The "IO Processing SVC 1220" now completes the LMU reassignment process by continuing or restarting the LMU virtualization operations that were paused or aborted, executing IOs that were queued pending LMU reassignment and processing normally any newly received IOs in step 1206.

In another embodiment, if there are any IOs addressing the particular LMU queued by the original LMU owner 1230 in the process of LMU reassignment, the step 1212 may further comprise the step that the original LMU owner 1230 issues a request of reassignment of the particular LMU back to it from the IO processing SVC 1220 (the new LMU owner).

In still another embodiment, if there is any IO addressing the particular LMU queued in the process of LMU reassignment by the original LMU owner 1230, the step 1212 may further comprise the step that the original LMU owner 1230 reroutes the queued IOs addressing the particular LMU to the IO processing SVC 1220 (the new LMU owner).

In still further embodiment, the steps 1209 and 1210 can be omitted. For example, when the host is configured to issue a single IO request at a time, i.e., a later IO request has to be issued after an earlier IO request is completed, while the SVS is performing in write-through mode. In such case, since there can be only one host IO request addressing a particular LMU in the SVS at the same time, when the IO processing SVC 1220 performs the LMU reassignment processes, such as steps 1201 and 1202 because it receives a host IO request addressing the particular LMU, there can be no more host IO request addressing the particular LMU queued by the LMU owner, and therefore steps 1209 and 1210 are not necessary.

Furthermore, in an embodiment of a SVS comprising more than two SVCs, i.e., when there is at least a third SVC in addition to the IO processing SVC 1220 and LMU owner SVC 1230, an arbitrating mechanism to arbitrate the reassignment requests to a particular LMU from different reassignment requester.

In such arbitrating mechanism, there should be an arbitrator SVC to arbitrate between the different reassignment requests, i.e., to decide to which reassignment requesters the LMU assignment should be transferred. In one embodiment, the arbitrator can be the LMU owner SVC, i.e., a floating arbitrator SVC which changes according to the change of the LMU owner. Alternatively, the arbitrator can be a specific SVC, i.e., a fixed arbitrator SVC which changes according to the change of the LMU owner. When a SVC receives a host IO addressing a particular LMU which is not assigned to it, it will issue a reassignment request to the arbitrator SVC. When the arbitrator SVC receives such requests from more than one requester SVCs, it will decide which of requester SVCs will be the new LMU owner and inform the new LMU owner.

In determining the new LMU owner of the particular LMU, one practical approach is that the requester SVC who has the earliest host IO request queued and waiting for execution will be assigned as the new LMU owner. This approach can reduce the potential of negative impact on performance due to the host IO request time-out. The implementation can be each SVC which keeps a list for recording information regarding receiving time of host IO request of other SVCs. When a SVC receives a host IO request addressing a LMU that is not assigned to it, it will notify such information to other SVCs in the SVS to update their own lists. The arbitrator can use this list to decide the new LMU owner.

Since the LMU reassignment process typically would cause a temporary pause in the IO stream that could cause a significant degradation in performance, LMU reassignment would typically be scheduled in such a way as to minimize the frequency of reassignment relative to the number of IOs processed. The waiting for an "appropriate" opportunity mentioned in the LMU reassignment process described above is where the LMU Owner 1230 would perform an intelligent analysis of previous and current states to determine when it would be best to start the reassignment procedure.

Figure 13:
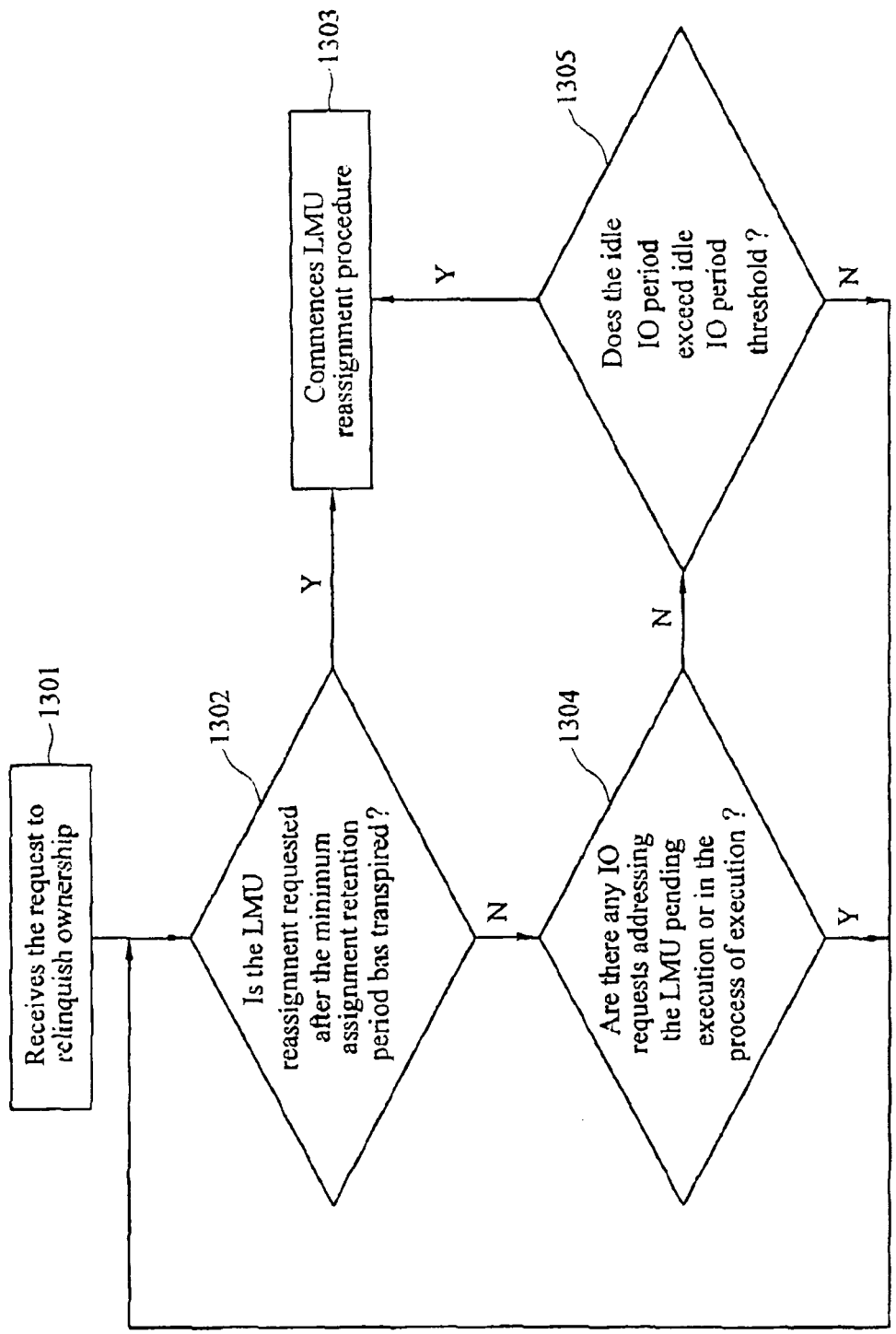
FIG. 13 depicts a flow chart of an embodiment of the LMU reassignment commencing timing analysis according to this invention.

Please refer to FIG. 13. One embodiment of this analysis would be to require that the LMU Owner retain ownership for a minimum period of time (referred to here as minimum assignment retention period) after gaining ownership so long as it continues to receive IOs addressing the LMU when the LMU owner receives the request to relinquish ownership in step 1301, if a LMU reassignment is requested after the period has transpired in step 1302, then LMU reassignment procedure commences immediately in step 1303. If a LMU reassignment is requested before the period has completely transpired and there are no longer any IOs addressing the LMU on the LMU Owner pending execution or in the process of execution in step 1304 and no IOs addressing the LMU have been received by the LMU Owner for another period of time (referred to here as the idle IO period threshold) in step 1305, then LMU assignment can be relinquished in step 1303.

The idea behind setting an idle IO period threshold is to anticipate whether or not the host has any more IOs to issue to the LMU owner. If this period of time elapses without any indication from the host that it does have more IOs to issue, then the LMU owner might assume that the host does indeed, no longer have any IOs pending issuance. The LMU owner might take a lack of receipt of host IOs addressing the particular LMU as such an indication. In the simplest implementation of this, the idle IO period might be set to start at the time of receipt of the last host IO addressing the particular LMU. However, this implementation may inaccurately anticipate the current host state in situations in which the idle IO period that is set to start when an IO is received exceeds the idle IO period threshold before the SVC completes the processing of the IO. Under such conditions, if the host is configured such that it only sends out a single IO at a time and waits for complete response corresponding to that IO to be received before issuing a second IO, then the SV subsystem may mistakenly assume that the host, for the time being, has no more IOs to issue.

Figure 15A:
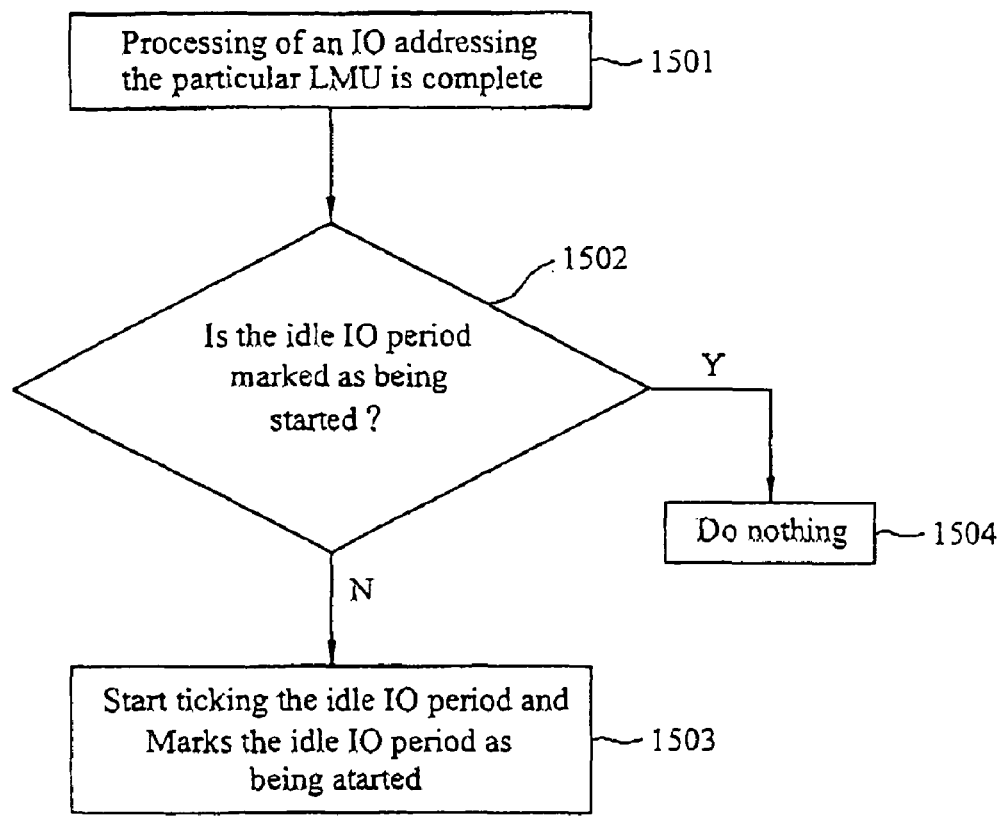
FIGS. 15A-15B illustrate an improved mechanism for setting the start of the idle IO period according to an embodiment of this invention.
Figure 15B:
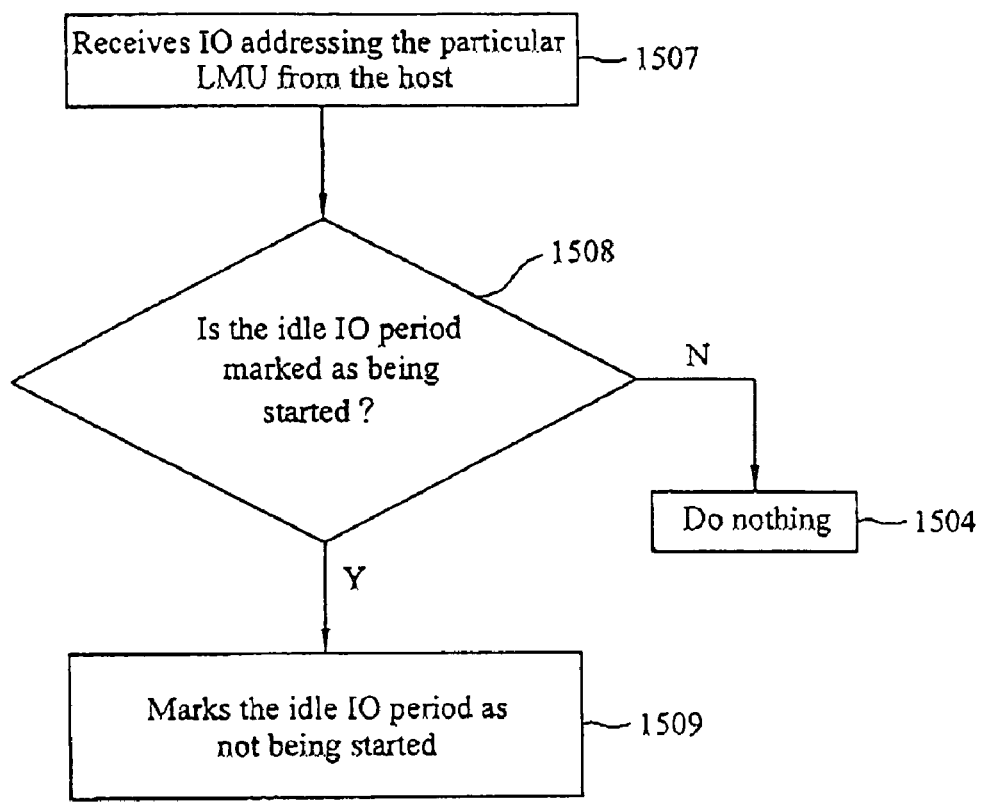

Please refer to FIGS. 15A and 15B. An improved mechanism for setting the start of the idle IO period would be to set it to the time when processing of an IO addressing the particular LMU is complete in step 1501 and mark the idle IO period as having started if the idle IO period is marked as not being started. As a result, the idle IO period starts ticking in steps 1502 and 1503. If it is already marked as started, then completion of IO processing does not change the start time in steps 1502 and 1504. If, after being started (which makes the test result in step 1508 affirmative), another IO addressing the particular LMU is received from the host in step 1507, then the idle IO period is marked as not being started in step 1509. In this mechanism, only if the idle IO period has been started will it be used in the determination of when the LMU reassignment should take place.

Figure 14A:
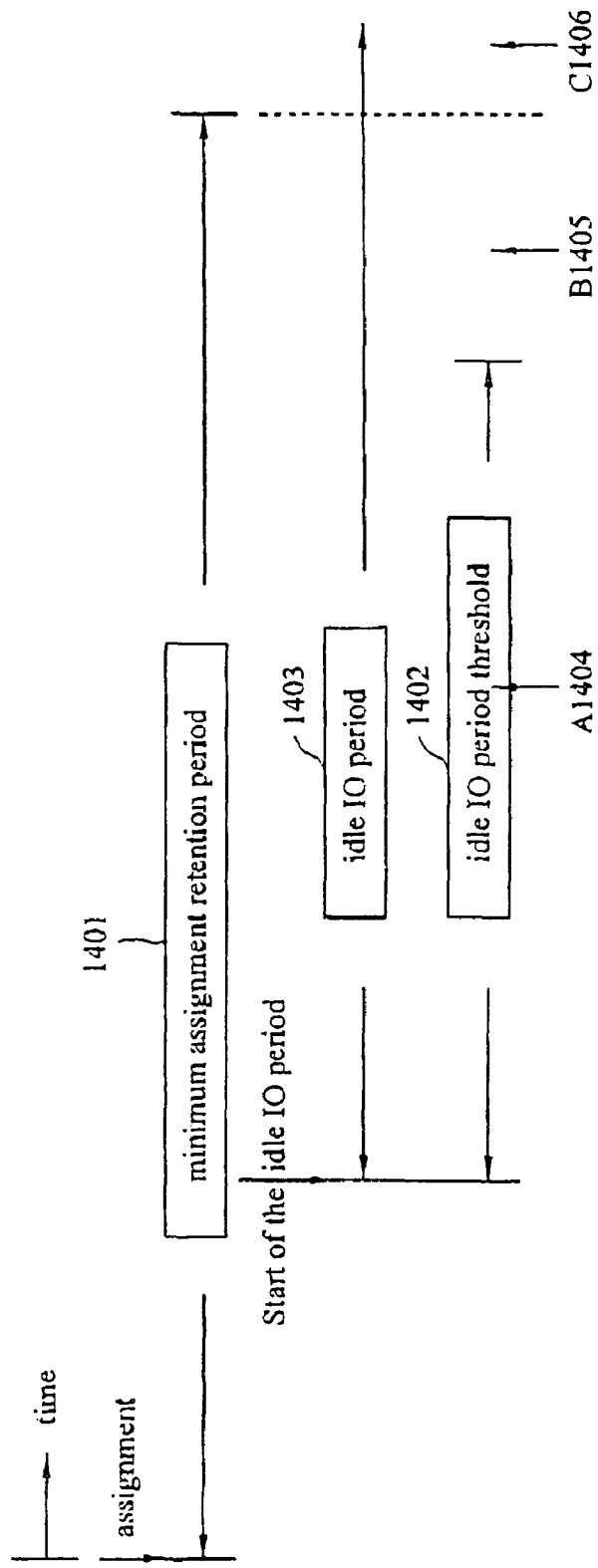
FIGS. 14A-14B illustrate some instances to explain the LMU reassignment commencing timing.
Figure 14B:
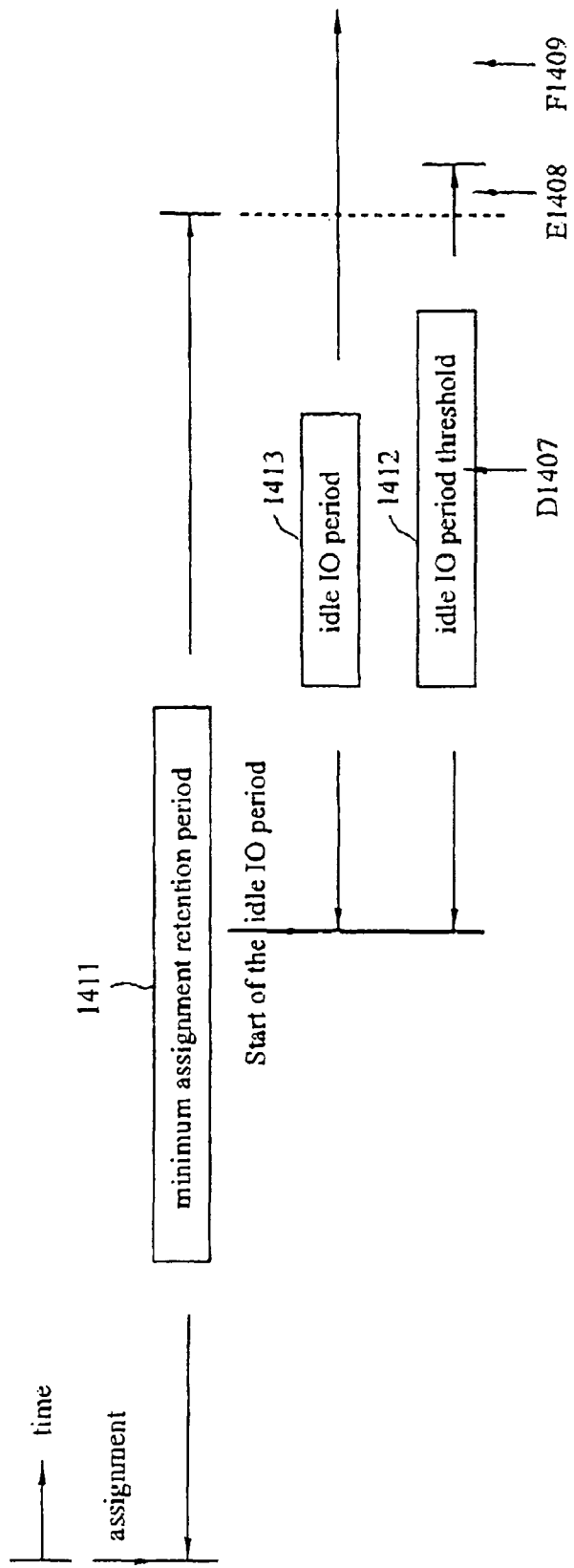

Please refer to FIGS. 14A and 14B. The minimum assignment retention period 1401, the idle IO period threshold 1402, the idle IO period 1403, and the request for LMU reassignment could have the following relations. FIG. 14A depicts a situation that the idle IO period 1403 start time begins early enough such that the idle IO period threshold 1402 has completely transpired during the minimum assignment retention period 1401. In this situation, when in a first case, case A, that an LMU reassignment request is posted at the time point A 1404 shown in the figure, which means before completely transpiring of the idle IO period threshold 1402, the reassignment request will not be performed. When in a second case, case B, that an LMU reassignment request is posted at the time point B 1405 shown in the figure, which means after completely transpiring of the idle IO period threshold 1402 while still during the minimum assignment retention period 1401, the reassignment request will be performed immediately. When in a third case, case C, that an LMU reassignment request is posted at the time point C 1406 shown in the figure, which means the minimum assignment retention period 1401 has completely transpired, the reassignment request will be performed immediately.

In the above mentioned cases A, in which the reassignment request is not allowed immediately, it could be allowed reassigning immediately after the minimum assignment retention period 1401 has transpired, or, alternatively, when the minimum assignment retention period 1401 has transpired, the reassignment request could be re-evaluated to decide if it is necessary to perform reassignment at that time, or, the LMU Owner could reject the request directly, depending on the configuration of the SVS.

FIG. 14B depicts a situation that the idle IO period 1413 start time begins too late to allow the idle IO period threshold 1412 to completely transpire before the end of the minimum assignment retention period 1413. In this situation, when in a first case, case D, that an LMU reassignment request is posted at the time point D 1407 shown in the figure, which means before completely transpiring of the idle IO period threshold 1412 and still during the minimum assignment retention period 1411, the reassignment request will not be performed before the minimum assignment retention period 1411 completely transpires. When in either a second case, case E, as shown at the time point E 1408, or in a third case, case F, as shown at the time point F 1409, in the figure, the reassignment request will be performed immediately since the minimum assignment retention period 1411 has transpired. In case E, the reassignment request is posted before the completely transpiring of the idle IO period threshold 1412 while beyond the minimum assignment retention period while in case F, the reassignment request is posted beyond both the completely transpiring of the idle IO period threshold and the minimum assignment retention period 1411.

In a more sophisticated embodiment, host-side IO rerouting and automatic dynamic LMU reassignment would be coordinated to achieve better performance characteristics. Host IOs addressing an LMU that is not currently assigned to the "receiving SVC" would be initially rerouted to the alternate SVC (the LMU Owner). The SVCs would perform intelligent analysis of the IO stream, especially the frequency of IO rerouting and the rate at which data associated with rerouted IOs is rerouted. If this analysis indicates that LMU reassignment could yield significant performance improvements due to, say, reductions in IO rerouting frequency and/or rate at which data associated with rerouted IOs is rerouted, then LMU reassignment would be automatically performed by the redundant SVC pair.

Figure 16A:
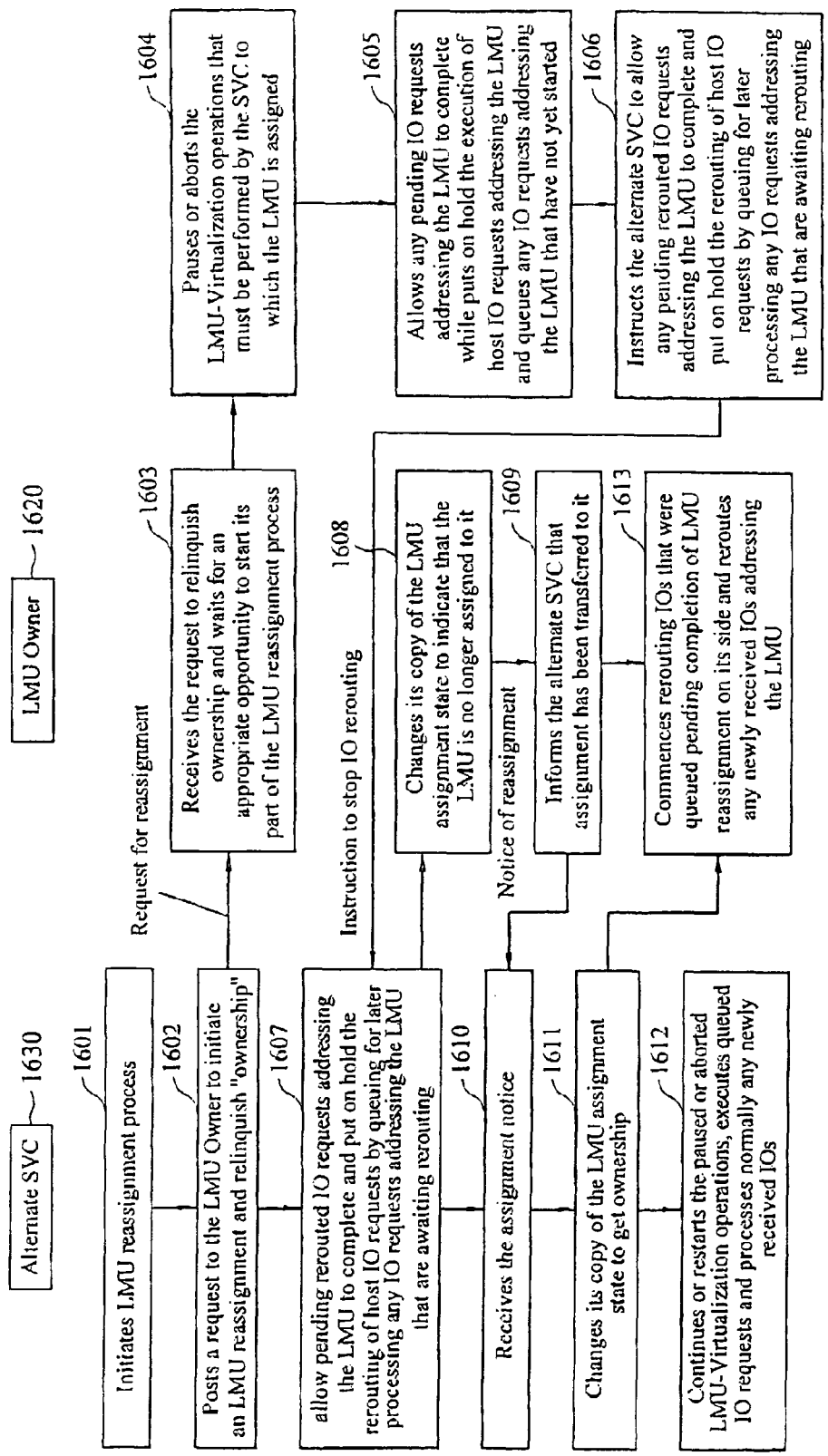
FIGS. 16A-16B depict the flow charts of an embodiment of the LMU reassignment process involving host-side IO rerouting functionality according to this invention.
Figure 16B:
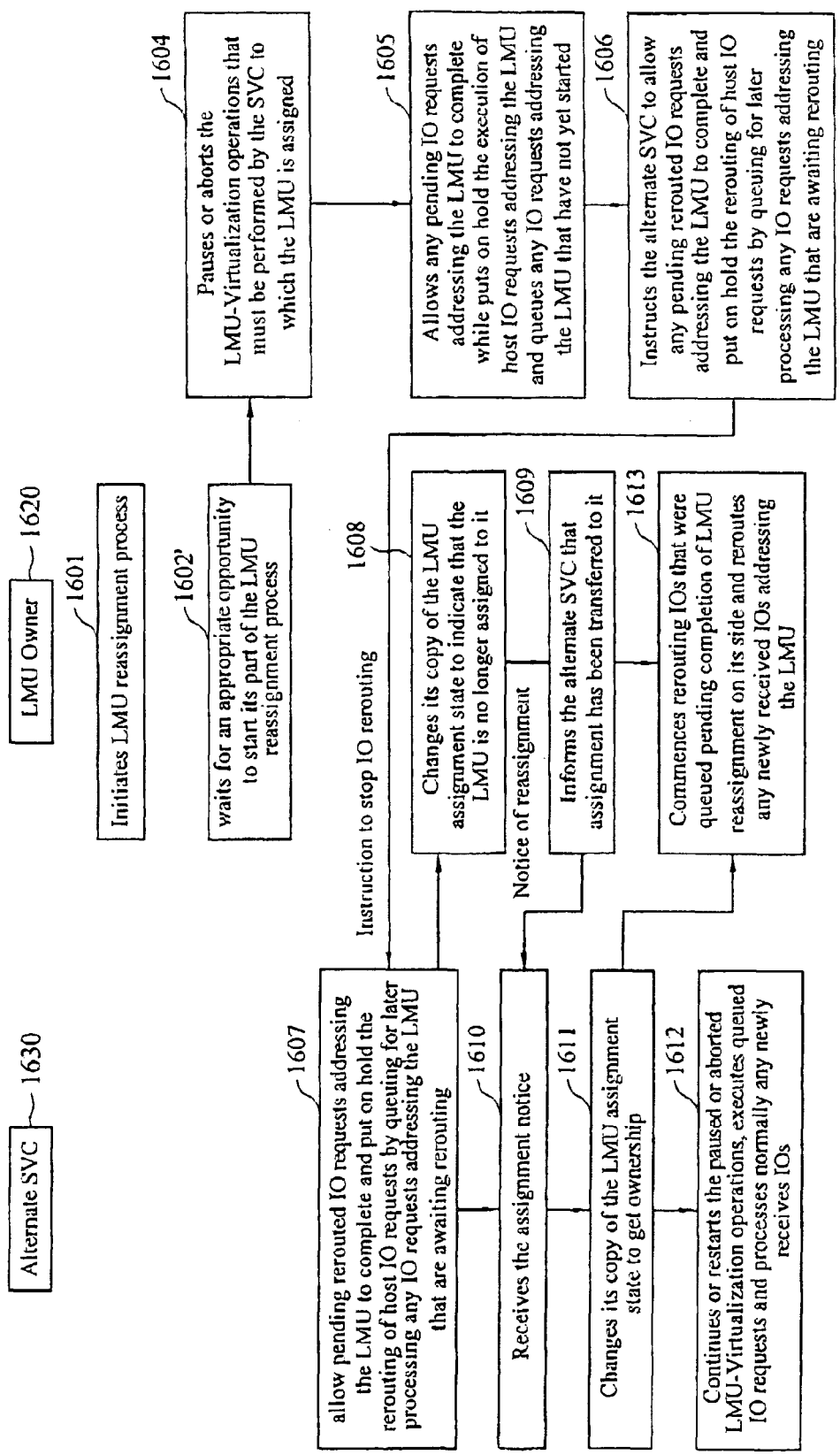

In this embodiment, the typical LMU reassignment process might be something like what is depicted in the flow charts in FIGS. 16A and 16B. When it is determined that an LMU reassignment should be performed, the SVC making the determination (which could be either SVC, the LMU Owner 1620 or the alternate SVC) posts a request to the LMU Owner 1620 to initiate an LMU reassignment and relinquish "ownership" in step 1602. In FIG. 16A, the LMU reassignment process is determined by the alternate SVC 1630 rather than the LMU owner 1620. The LMU Owner 1620 then waits for an "appropriate" opportunity to start its part of the LMU reassignment process in step 1603. This process typically entails pausing or aborting LMU Virtualization operations that must be performed by the SVC to which the LMU is assigned (e.g., PSD Data Reconstruction) in step 1604 and allowing any pending IO requests addressing the LMU to complete while putting on hold the execution of host IO requests addressing the LMU and queuing any IO requests addressing the LMU that have not yet started in step 1605. In addition, the LMU Owner 1620 instructs the alternate SVC to allow any pending rerouted IO requests addressing the LMU to complete and put on hold the rerouting of host IO requests by queuing for later processing any IO requests addressing the LMU that are awaiting rerouting in step 1606. The alternate SVC allows any pending IO requests addressing the LMU to complete while putting on hold the execution of host IO requests addressing the LMU and queuing any IO requests addressing the LMU that have not yet started in step 1607. When the LMU virtualization operations are paused or aborted and all pending IO requests addressing the LMU on both SVCs have completed, the LMU Owner 1620 changes its copy of the LMU assignment state to indicate that the LMU is no longer assigned to it in step 1608. This might include modifying data cache control structures to relinquish ownership of cache data and resources associated with the LMU. The LMU Owner 1620 now informs the alternate SVC that assignment has been transferred to it in step 1609. After the alternate SVC receives the assignment notice in step 1610, the alternate SVC then changes its copy of the LMU assignment state to indicate that the LMU is now assigned to it, making it the new LMU Owner in step 1611. This also might involve modifying its own data cache control structures to take over ownership of cache data and resources associated with the LMU. The new LMU Owner now completes the LMU reassignment process by continuing or restarting the LMU virtualization operations that were paused or aborted, executing IOs that were queued pending completion of the LMU reassignment and processing normally any newly received IOs in step 1612, while the original LMU Owner 1620 commences rerouting IOs that were queued pending completion of LMU reassignment on its side and rerouting any newly received IOs in step 1613. In FIG. 16B, the LMU reassignment process is determined by the LMU owner 1620 and the step of "posts a request to the LMU Owner 1620 to initiate an LMU reassignment and relinquish "ownership" in step 1602 and the operation "receives the request to relinquish ownership" in step 1603 are internal operations in the LMU owner 1620. When there are more than two SVCs in the SVS, in step 1606, the LMU Owner 1620 instructs other SVCs to allow any pending rerouted IO requests addressing the LMU to complete and put on hold the rerouting of host IO requests by queuing for later processing any IO requests addressing the LMU that are awaiting rerouting, and in step 1609, the LMU Owner 1620 informs other SVCs that assignment has been transferred to it.

Figure 17A:
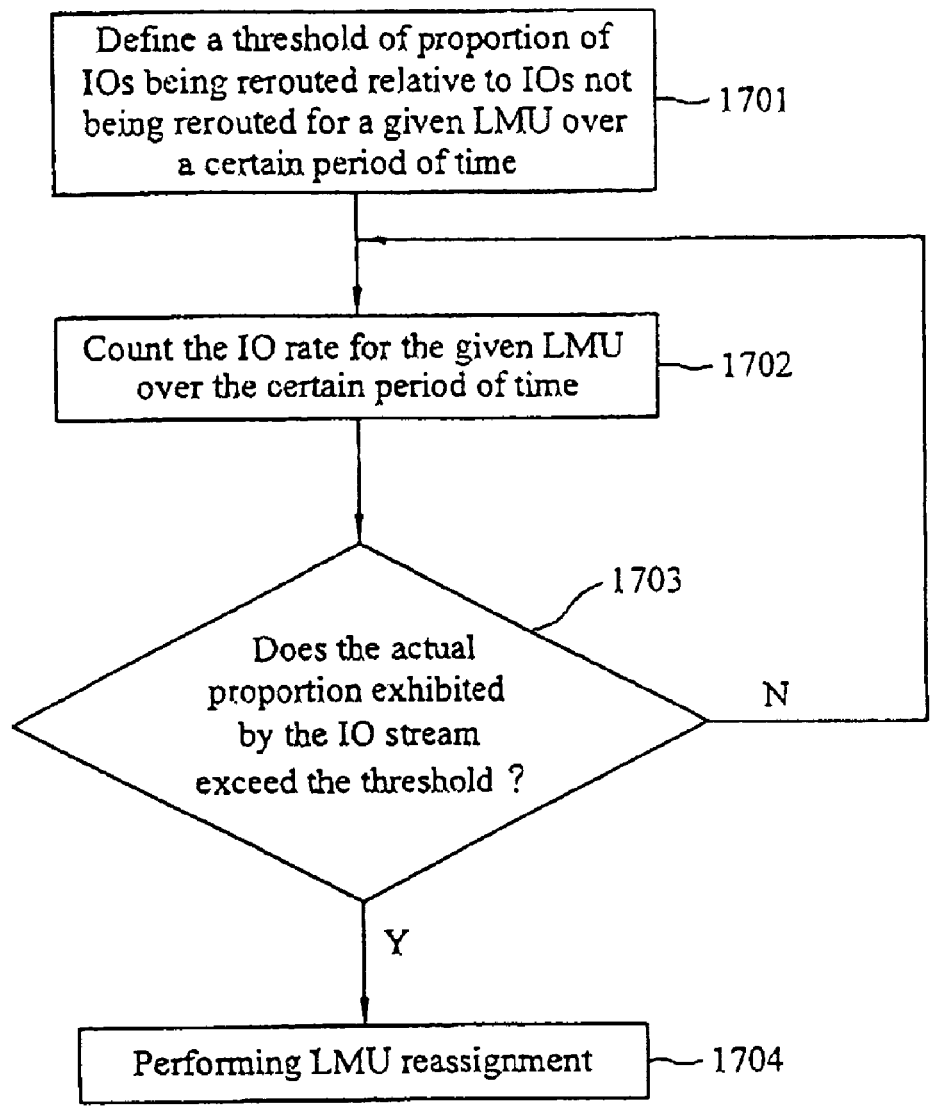
FIG. 17A illustrates an embodiment of the intelligent IO stream analysis according to this invention.

Referring to FIG. 17A, one embodiment of the intelligent IO stream analysis mentioned above might include defining a first threshold of proportion of IOs being rerouted relative to IOs not being rerouted for a given LMU over a certain period of time in step 1701 and count the IO rate for a given LMU over the certain period of time in step 1702. If the actual proportion exhibited by the IO stream exceeds the first threshold in step 1703, then an LMU reassignment would be performed to reassign the LMU to the alternate controller in step 1704.

Figure 17B:
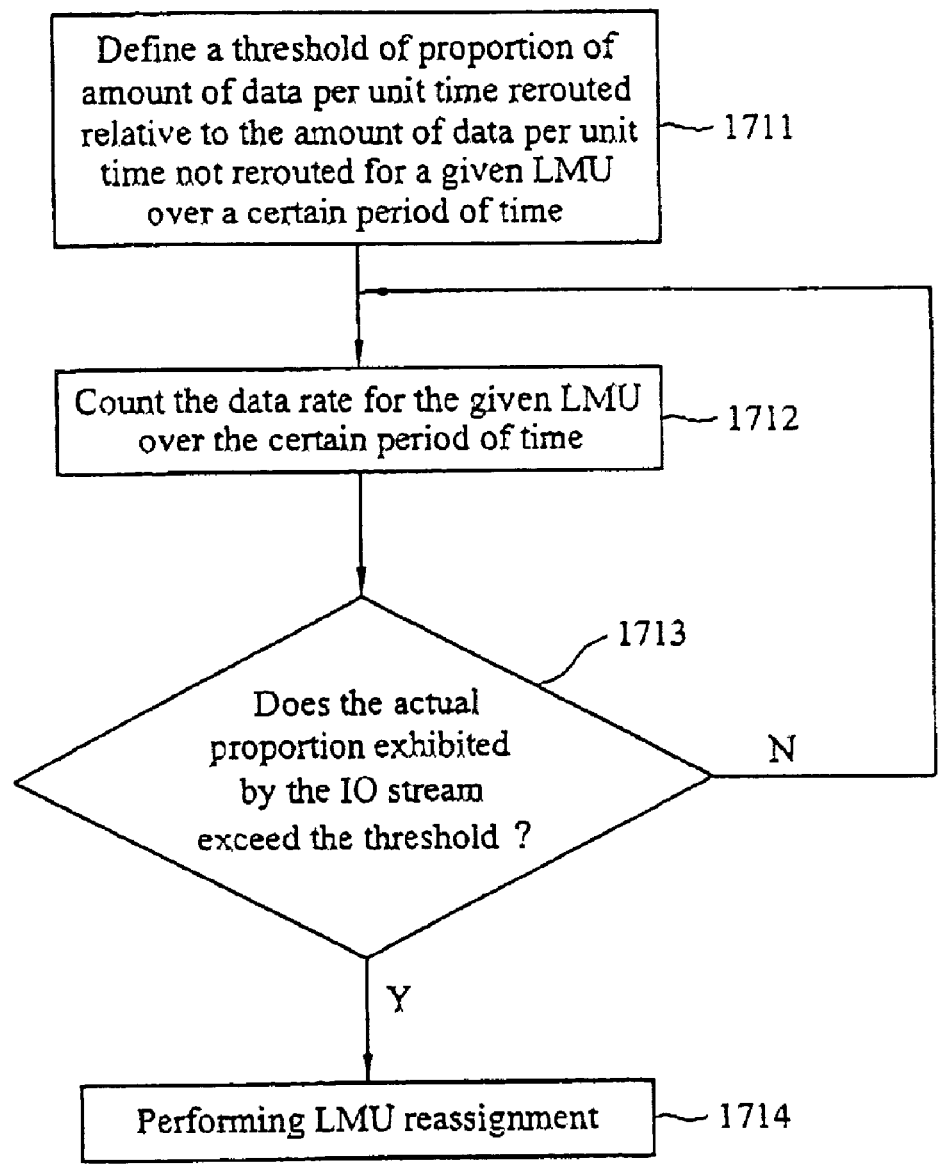
FIG. 17B illustrates another embodiment of the intelligent IO stream analysis according to this invention.

Referring to FIG. 17B, another embodiment of the intelligent IO stream analysis might include defining a second threshold similar to the first but for proportion of amount of data per unit time rerouted relative to the amount of data per unit time not rerouted for a given LMU over a certain period of time in step 1711 and count the data rate for a given LMU over the certain period of time in step 1712. Similarly, if the actual proportion exhibited by the IO stream exceeds the second threshold in step 1713, then an LMU reassignment would be performed in step 1714.

Figure 17C:
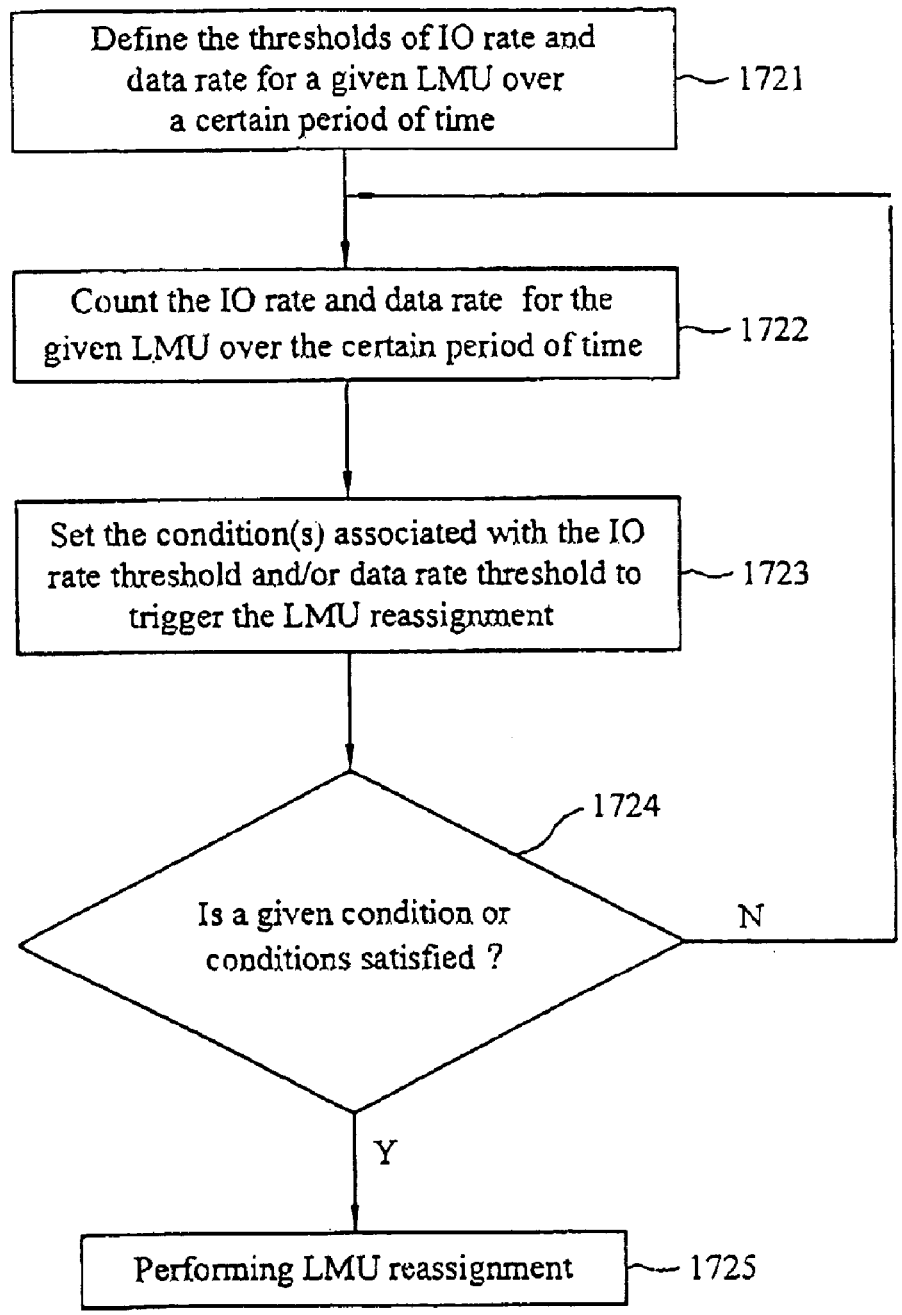
FIG. 17C illustrates yet another embodiment of the intelligent IO stream analysis according to this invention.

Referring to FIG. 17C, yet another embodiment might define both of the above-mentioned first and second thresholds and further define a threshold mechanism associated with the first and second thresholds in step 1721 and count the IO rate and data rate for a given LMU over the certain period of time in step 1722 and set the condition(s) associated with the IO rate threshold and/or data rate threshold to trigger the LMU reassignment in step 1723. An LMU reassignment would be triggered in step 1725 when a given condition or conditions in the threshold mechanism is satisfied in step 1724. One example of the threshold mechanism could be when either of the first and second thresholds is exceeded by the associated actual proportion exhibited by the IO stream, then an LMU reassignment would be performed in step 1725. Another example of the threshold mechanism could be when each of the first and second thresholds is exceeded by the associated actual proportion exhibited by the IO stream, respectively, then an LMU reassignment would be performed. Although two examples are given, other threshold mechanisms associating with the first and second thresholds can be easily made by those skilled in the art to accomplish the functionality of this embodiment without departure from the spirit of the present invention.

Figure 17D:
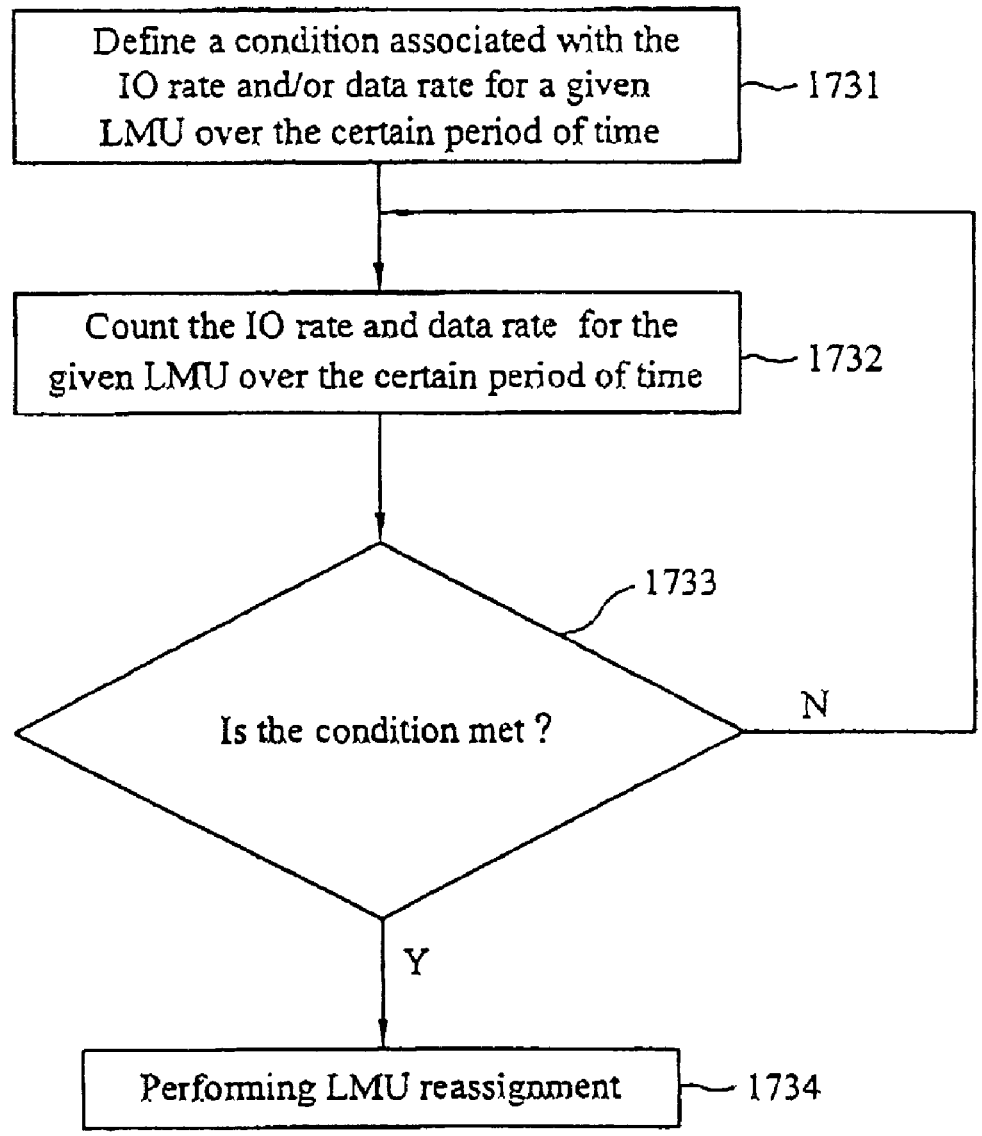
FIG. 17D illustrates a further embodiment of the intelligent IO stream analysis according to this invention.

Referring to FIG. 17D, a further embodiment might define a condition associated with the IO rate and data rate for a given LMU over the certain period of time in step 1731 and count the IO rate and data rate for a given LMU over the certain period of time in step 1732. Test if the condition is met in step 1733 and perform the LMU reassignment to reassign the LMU to the alternate SVC when the condition is met in step 1734.

One problem that might arise with the above intelligent IO stream analysis mechanisms if the IO rate and/or data rate to a given LMU through both SVCs is fairly close is that it could give rise to overly frequent LMU reassignment which could, itself, have a substantial negative impact on performance due to the pauses in the IO stream that are imposed each time an LMU reassignment is performed. So, it is beneficial to include a mechanism to limit the frequency of LMU reassignments.

Figure 18:
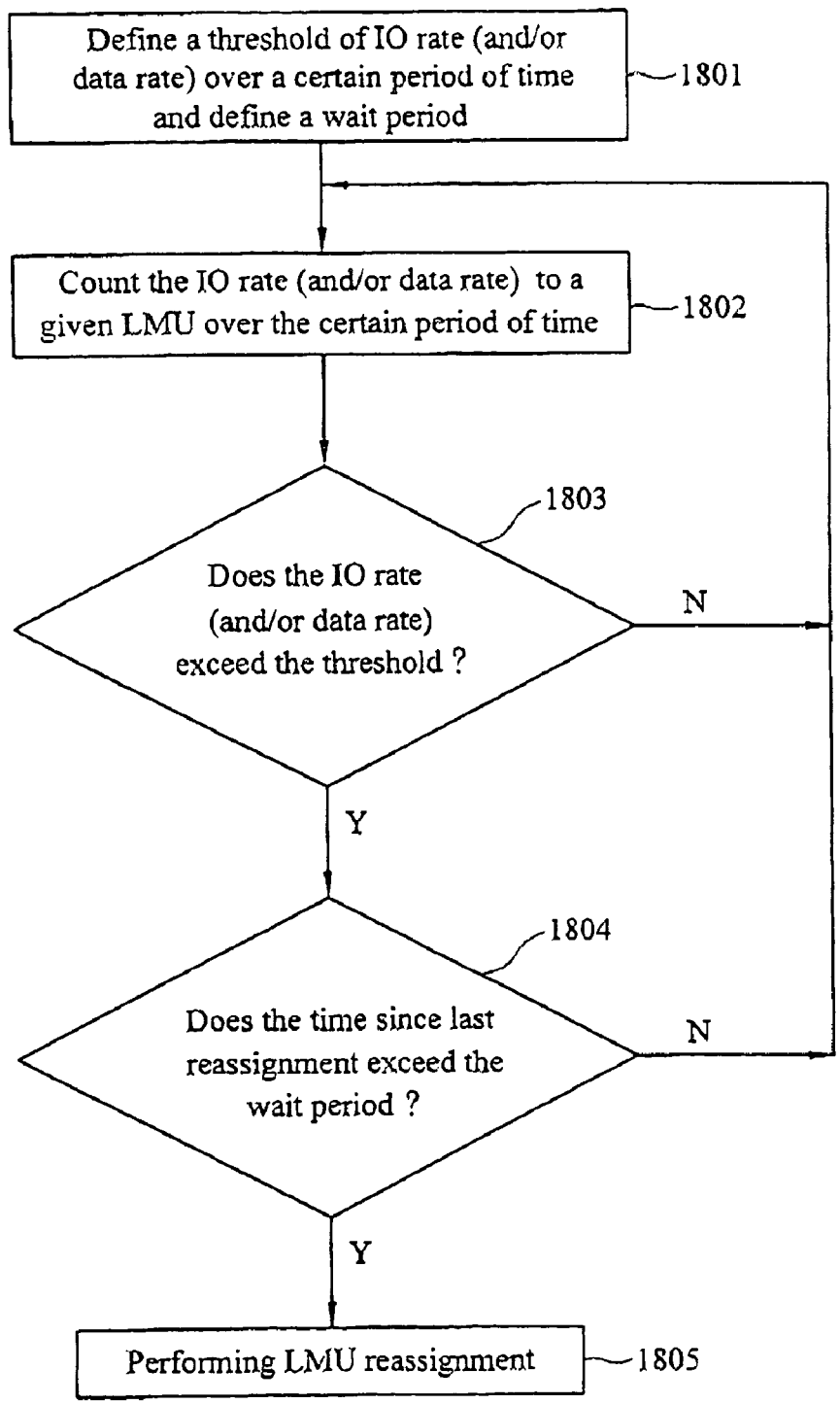
FIG. 18 illustrates still a further embodiment of the intelligent IO stream analysis according to this invention.

Referring to FIG. 18, one embodiment of this might include defining a wait period after a first LMU reassignment is performed that must transpire before a second reassignment to reassign the LMU back to the SVC to which it was originally assigned prior to the first reassignment can be initiated. At the beginning, step 1801 defines a threshold of IO rate and/or data rate over a certain period of time and define a wait period. Following step 1802, it counts the IO rate and/or data rate to a given LMU over the certain period of time. In step 1803, it checks if the IO rate and/or data rate exceeds the threshold. Once the IO rate and/or data rate exceeds the threshold, step 1804 is performed to check if the time since last reassignment exceeds the wait period. Once the time since last reassignment exceeds the wait period, LMU reassignment is performed in step 1805.

Figure 19A:
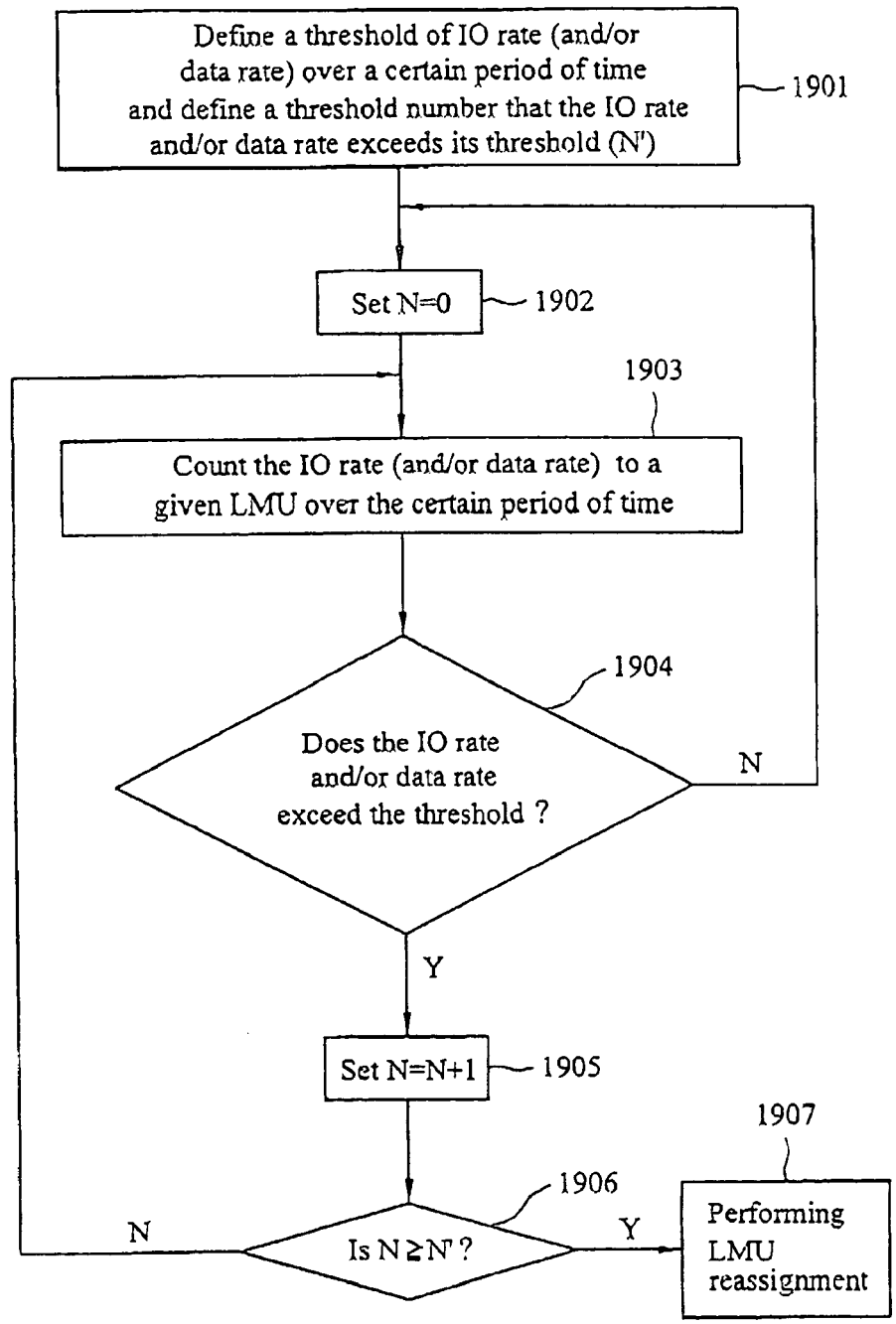
FIGS. 19A-19B illustrates further embodiments of the intelligent IO stream analysis according to this invention.
Figure 19B:
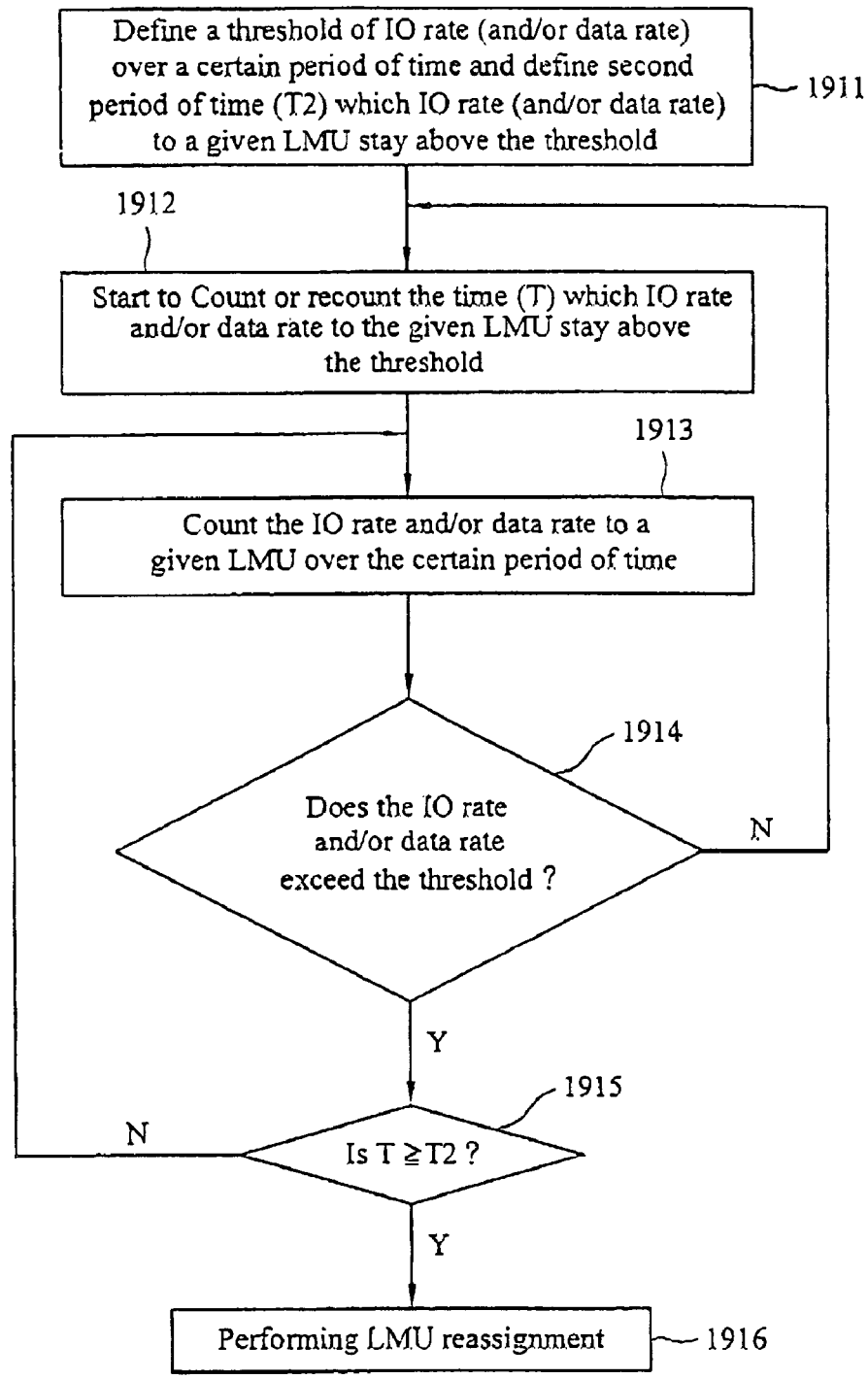

Referring to FIGS. 19A and 19B, another embodiments of this might be to define a period of time or number of above-mentioned periods which the above-mentioned actual IO and/or Data-rate proportions must stay above the associated thresholds before a LMU reassignment is triggered. With reference to the FIG. 19A, in step 1901, a threshold of IO rate and/or data rate over a certain period of time is defined and a threshold number that the IO rate and/or data rate exceeds its threshold (N') is defined. In step 1902, N=0 is set at the beginning, in which N is defined as the number that the IO rate and/or data rate exceeds the threshold and thus in step 1903 the IO rate and/or data rate is counted to a given LMU over the certain period of time. Then, in step 1904, whether the IO rate and/or data rate exceeds the threshold is checked. If in step 1904, the IO rate and/or data rate exceeds the threshold, N=N+1 is set in step 1905. In step 1906, whether N is equal to or larger than N' (N≧N') is checked. If in step 1906, N≧N' is fulfilled, LMU reassignment is performed in step 1907. If N≧N' is not fulfilled in step 1906, then the process goes back to step 1903.

With reference to FIG. 19B, in step 1911 a threshold of IO rate and/or data rate over a certain period of time is defined and a threshold period of time (T2) which IO rate and/or data rate to a given LMU stays above the threshold is defined. In step 1912, the time (T) which IO rate and/or data rate to a given LMU stay above the threshold is started to count or recount. In step 1913, then IO rate and/or data rate to a given LMU over the certain period of time is counted. In step 1914, whether the IO rate and/or data rate exceeds the threshold is checked. If the IO rate and/or data rate does not exceed the threshold in step 1914, then the process goes back to step 1912. If the IO rate and/or data rate exceeds the threshold in step 1914, the process goes to step 1915 to check whether the counted time T is equal to or larger than the threshold period of time T2 (T≧T2). In step 1915, when T≧T2 is fulfilled, step 1916 follows step 1915; when T≧T2 is not fulfilled, the process goes to step 1913. In step 1916, LMU reassignment is performed.

There are situations in which it might be beneficial from a performance standpoint to assign an LMU to the SVC that does not receive most of the IOs that the host issues to the LMUs. This might happen if there is a substantial imbalance in processing load between the two SVCs when the LMUs are assigned such that IOs are always processed by the receiving SVC. If, for example, there are 4 LMUs, LMU #1 to LMU #4, with IOs addressed to LMU #1 and LMU #2 being sent by the host to SVC-A for processing and IOs addressed to LMU #3 and LMU #4 being sent to SVCB for processing and LMU #1 and LMU #2 are both in the process of processing-intensive LMU virtualization operations (e.g., PSD Data Reconstruction), a configuration that assigns LMU #1 and LMU #3 to SVC-A and LMU #2 and LMU #4 to SVC-B and then rerouting IOs addressing LMU #2 and LMU #3 to route them over to the SVCs to which the LMUs are assigned may actually yield better performance than by keeping LMU #1 and LMU #2 together on the same SVC and, thereby, avoiding any rerouting. This is because performance improvement to be had by balancing the LMU virtualization operation load between the SVCs could exceed the penalty associated with the rerouting that must be done because SVC to which the LMUs are assigned is different from the SVCs that receives most of the host IOs addressing the LMU.

Figure 20:
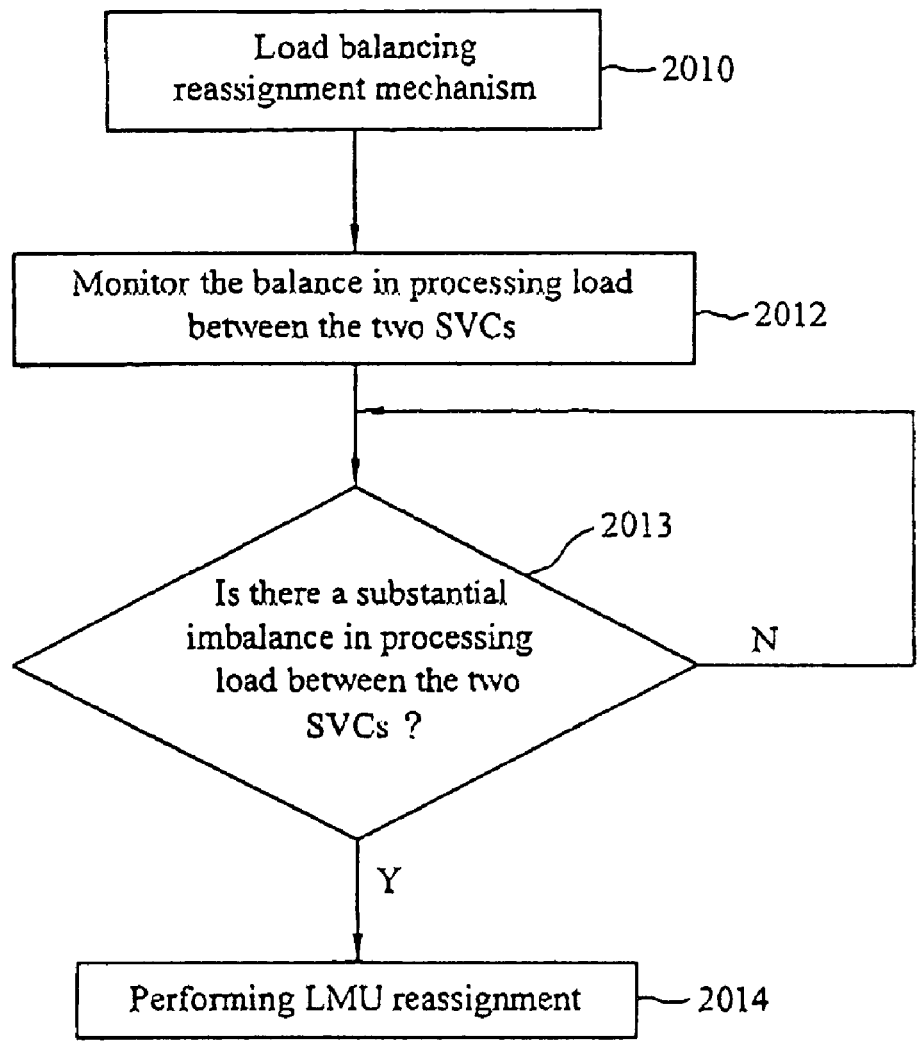
FIG. 20 depicts a load balancing LMU reassignment mechanism according to an embodiment of this invention.

In order to accommodate this kind of a situation, in addition to analyzing host IO stream characteristics to determine to which SVC the LMU should be assigned (and, maybe, reassigned if not currently assigned to the optimal SVC), the processing load of each SVC could also be taken into account. An embodiment of a load balancing LMU reassignment mechanism considering such is depicted in the flow chart in FIG. 20. In the load balancing reassignment mechanism 2010, in step 2012, the balance in processing load between the two SVCs is monitored, e.g., by calculating the processing load of the SVCs. In step 2013, check whether or not there is a substantial imbalance in processing load between the two SVCs. If it is an affirmative answer in step 2013, perform LMU reassignment in step 2014; otherwise, keep on checking in step 2013. Relative performance of each LMU assignment scenario, which would consist of a tradeoff between the performance benefits of balancing the processing load between the two SVCs and the performance costs of rerouting IOs, could be computed and the assignment scenario achieving the best overall performance could then be chosen and LMUs assigned to SVCs accordingly.

Figure 21:
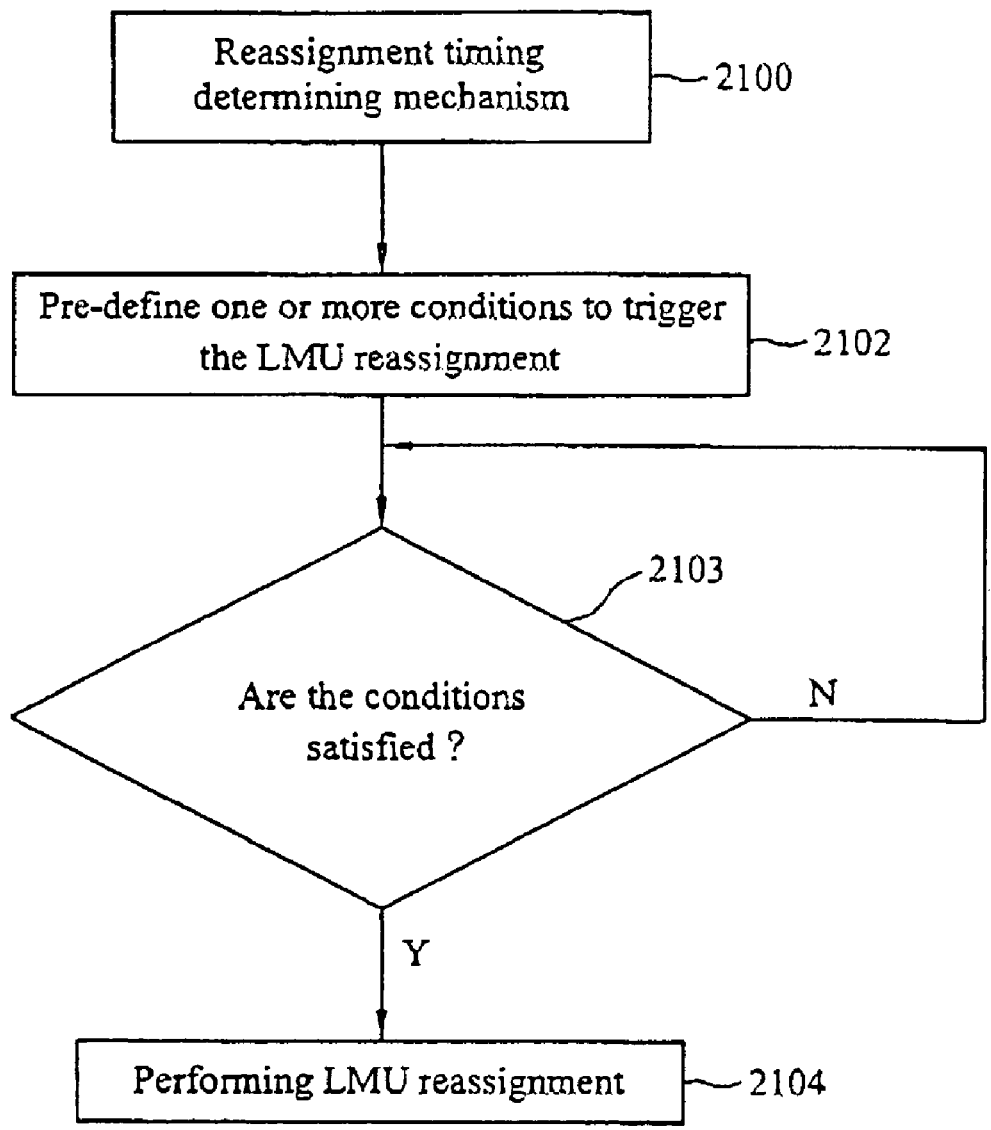
FIG. 21 depicts a reassignment timing determining mechanism according to an embodiment of this invention.

According to the above-mentioned embodiments of the present invention, a reassignment timing determining mechanism 2100 is proposed in FIG. 21. In step 2102, pre-define one or more conditions to trigger the LMU reassignment. In step 2103, determine whether one or more conditions pre-defined in the reassignment timing determining mechanism are satisfied. If it is satisfied in step 2103, the process goes to step 2104 to perform the dynamic LMU reassignment. While on the other hand, the dynamic LMU reassignment functionality will not be triggered if some of the pre-defined conditions are not satisfied. Or, according to an alternate mechanism, the dynamic LMU reassignment functionality will not be triggered if none of the pre-defined conditions is satisfied.

Although the present invention has been described in considerable detail with reference to certain preferred embodiments thereof, other embodiments are possible. Therefore, their spirit and scope of the appended claims should no be limited to the description of the preferred embodiments container herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for performing host-side IO rerouting in a storage virtualization subsystem (SVS) comprising a plurality of redundant storage virtualization controllers (SVCs) including a first SVC and a second SVC, and a physical storage device (PSD) array connected thereto including at least one PSD, the method comprising:

providing at least one logical media unit (LMU) including sections of said PSD array, said at least one LMU including a first LMU that is assigned to only one of said SVCs at the same time;

receiving, by said first SVC, a host IO request addressing said first LMU;

determining whether said first SVC that receives the host IO request addressing said first LMU is an LMU owner of said first LMU; and rerouting, when said first SVC and said second SVC are on-line, said host IO request to said second SVC that is determined to be the LMU owner of said first LMU when said first SVC is determined not to be the LMU owner of said first LMU; and wherein said rerouting step comprises the steps of:

the first SVC forwarding the host IO request to the second SVC over an inter-controller communications (ICC) channel;

the second SVC requesting first data from the first SVC if the host IO request requires that the first data be transferred from a host;

the host IO request being executed by the second SVC;

the second SVC forwarding second data to be transferred to the host to the first SVC if the host IO request requires that the second data be transferred to the host;

the first SVC forwarding the second data to the host; and on the host IO request completion, completion status of the host IO request being forwarded to the first SVC by the second SVC and then forwarded to a host by the first SVC.

2. The method defined in claim 1, wherein the first data received from the host is forwarded to the second SVC over the ICC channel.

3. The method defined in claim 1, wherein the second data is forwarded to the host over a host-side IO device interconnect over which the host IO request was received.

4. The method defined in claim 1, further comprising executing said host IO request by said first SVC when said first SVC is determined to be the LMU owner of said first LMU.

5. The method defined in claim 1, wherein said rerouting step is performed through the ICC channel connected between said first and second SVCs.

6. The method defined in claim 5, wherein said ICC channel can be one of the following type: Fibre Channel supporting point-to-point connectivity, Fibre Channel supporting public loop connectivity, Fibre Channel supporting private loop connectivity, parallel SCSI, Ethernet implementing the iSCSI protocol, Serial-Attached SCSI (SAS), and Serial ATA.

7. The method defined in claim 1, wherein said SVS is capable of performing dynamic LMU reassignment.

8. The method defined in claim 7, further comprising the step of, before the step of rerouting said host IO request, determining whether a timing for reassigning assignment of LMU ownership to said first SVC is reached.

9. The method defined in claim 8, wherein the step of determining whether a timing for reassigning assignment of LMU ownership is reached is performed by performing an intelligent IO stream analysis to determine whether a timing for reassigning assignment of LMU ownership is reached.

10. The method defined in claim 8, wherein the step of determining whether a timing for reassigning assignment of LMU ownership is reached is performed by performing a load balancing LMU reassignment method to determine whether a timing for reassigning assignment of LMU ownership is reached.

11. The method defined in claim 8, wherein the step of rerouting said host IO request to the second SVC is performed only when said timing for reassigning assignment of LMU ownership is not reached.

12. A storage virtualization subsystem (SVS), comprising:

a plurality of redundant storage virtualization controllers (SVCs) including a first SVC and a second SVC, and a physical storage device (PSD) array connected thereto comprising at least one PSD;

at least one logical media unit (LMU) comprising sections of said PSD array, said at least one LMU including a first LMU that is assigned to only one of said SVCs at the same time;

a determining mechanism for determining whether said first SVC that receives a host IO request addressing said first LMU is an LMU owner of said first LMU; and a rerouting mechanism for rerouting, when said first SVC and said second SVC are on-line, said host IO request to said second SVC that is determined to be the LMU owner of said first LMU when said first SVC is determined not to be the LMU owner of said first LMU;

wherein said step of rerouting, when said first SVC and said second SVC are on-line, said host IO request to said second SVC that is determined to be the LMU owner of said first LMU when said first SVC is determined not to be the LMU owner of said first LMU comprises the steps of:

the first SVC forwarding the host IO request to the second SVC over an inter-controller communications (ICC) channel;

the second SVC requesting first data from the first SVC if the host IO request requires that the first data be transferred from a host;

the host IO request being executed by the second SVC;

the second SVC forwarding second data to be transferred to the host to the first SVC if the host IO request requires that the second data be transferred to the host;

the first SVC forwarding the second data to the host; and on the host IO request completion, completion status of the host IO request being forwarded to the first SVC by the second SVC and then forwarded to a host by the first SVC.

13. The SVS defined in claim 12, wherein said SVS is capable of performing dynamic LMU reassignment.

14. The SVS defined in claim 13, wherein said dynamic LMU reassignment is performed by the SVS automatically.

15. The SVS defined in claim 13, wherein said dynamic LMU reassignment is performed manually.

16. The SVS defined in claim 12, wherein the first data received from the host is forwarded to the second SVC over the ICC channel.

17. The SVS defined in claim 12, wherein the second data is forwarded to the host over a host-side IO device interconnect over which the host IO request was received.

18. A computer system, comprising:

a host and a storage virtualization subsystem (SVS) connected thereto,. said SVS including:

a plurality of redundant storage virtualization controllers (SVCs) including a first SVC and a second SVC, and a physical storage device (PSD) array connected thereto including at least one PSD, and defining at least one logical media unit (LMU) including sections of said PSD array, said at least one LMU including a first LMU that is assigned to only one of said SVCs at the same time, said SVS further comprising:

a determining mechanism for determining whether said first SVC that receives a host IO request addressing said first LMU is an LMU owner of said first LMU; and a rerouting mechanism for rerouting, when said first SVC and said second SVC are on-line, said host IO request to said second SVC that is determined to be the LMU owner of said first LMU when said first SVC is determined not to be the LMU owner of said first LMU;
wherein said step of rerouting, when said first SVC and said second SVC are on-line, said host IO request to said second SVC that is determined to be the LMU owner of said first LMU when said first SVC is determined not to be the LMU owner of said first LMU comprises the steps of:
  the first SVC forwarding the host IO request to the second SVC over an inter-controller communications (ICC) channel;
  the second SVC requesting first data from the first SVC if the host IO request requires that the first data be transferred from the host;
  the host IO request being executed by the second SVC;
  the second SVC forwarding second data to be transferred to the host to the first SVC if the host IO request requires that the second data be transferred to the host;
  the first SVC forwarding the second data to the host; and
  on the host IO request completion, completion status of the host IO request being forwarded to the first SVC by the second SVC and then forwarded to the host by the first SVC.

19. The computer system defined in claim 18, wherein said SVS is capable of performing dynamic LMU reassignment.

20. The computer system defined in claim 18, wherein said SVS and the host are configured to perform split redundant pathing.

21. The computer system defined in claim 18, wherein said host is pre-configured to issue IO requests addressing said first LMU through a first interconnect connected between said host and one of said SVCs to which the first LMU is assigned; and when said first LMU is not accessed via said first interconnect, said host issue IO requests addressing said first LMU through a second interconnect connected between said host and another of said SVCs.

22. The computer system defined in claim 18, wherein the first data received from the host is forwarded to the second SVC over the ICC channel.

23. The computer system defined in claim 18, wherein the second data is forwarded to the host over a host-side IO device interconnect over which the host IO request was received.

24. A storage virtualization controller (SVC) for use in a storage virtualization subsystem (SVS) having a plurality of SVCs as a first SVC thereof with a second SVC of said plurality of SVCs and defining at least one logical media unit (LMU) including sections of a PSD array, said at least one LMU including a first LMU that is assigned to only one of said SVCs at the same time, said storage virtualization controller comprising:
  a central processing circuitry (CPC) for performing IO operations in response to IO requests of a host;
  at least one host-side IO device interconnect port provided for coupling to said host;
  at least one inter-controller communications (ICC) channel controller for connecting to said second SVC;
  a determining mechanism for determining whether the first SVC that receives a host IO request addressing said first LMU is an LMU owner of said first LMU; and
  a rerouting mechanism for rerouting, when said first SVC and said second SVC are on-line, said host IO request to the second SVC that is determined to be the LMU owner of said first LMU when said first SVC is determined not to be the LMU owner of said first LMU, wherein said CPC is configured to perform host-side IO rerouting through said at least one ICC channel controller; and
wherein said step of rerouting, when said first SVC and said second SVC are on-line, said host IO request to said second SVC that is determined to be the LMU owner of said first LMU when said first SVC is determined not to be the LMU owner of said first LMU comprises the steps of:
  the first SVC forwarding the host IO request to the second SVC over the ICC channel;
  the second SVC requesting first data from the first SVC if the host IO request requires that the first data be transferred from the host;
  the host IO request being executed by the second SVC;
  the second SVC forwarding second data to be transferred to the host to the first SVC if the host IO request requires that the second data be transferred to the host;
  the first SVC forwarding the second data to the host; and
  on the host IO request completion, completion status of the host IO request being forwarded to the first SVC by the second SVC and then forwarded to a host by the first SVC.

25. The SVC defined in claim 24, wherein said SVC comprises at least one device-side IO device interconnect port provided for coupling to the physical storage device (PSD) array comprising at least one PSD.

26. The SVC defined in claim 24, wherein said SVC is capable of performing dynamic LMU reassignment.

27. The SVC defined in claim 24, wherein the first data received from the host is forwarded to the second SVC over the ICC channel.

28. The SVC defined in claim 24, wherein the second data is forwarded to the host over a host-side IO device interconnect over which the host IO request was received.

* * * * *

UNITED STATES PATENT AND TRADEMARK OFFICE
CERTIFICATE OF CORRECTION

| | | |
|---|---|---|
| PATENT NO. | : 7,814,293 B2 | Page 1 of 1 |
| APPLICATION NO. | : 11/182840 | |
| DATED | : October 12, 2010 | |
| INVENTOR(S) | : Michael Gordon Schnapp et al. | |

It is certified that error appears in the above-identified patent and that said Letters Patent is hereby corrected as shown below:

IN THE TITLE PAGE, ITEM [73]:
DELETE THE ASSIGNEE NAME "INFOTREND TECHNOLOGY INC."
AND INSERT THE NAME --INFORTREND TECHNOLOGY INC.--

Signed and Sealed this
Eighth Day of March, 2011

David J. Kappos
*Director of the United States Patent and Trademark Office*